US012428230B1

(12) United States Patent
Menassa

(10) Patent No.: US 12,428,230 B1
(45) Date of Patent: Sep. 30, 2025

(54) ATTRIBUTE-BASED FULFILLMENT OPERATIONS

(71) Applicant: Amazon Technologies, Inc., Seattle, WA (US)

(72) Inventor: Roland J. Menassa, Macomb, MI (US)

(73) Assignee: Amazon Technologies, Inc., Seattle, WA (US)

( * ) Notice: Subject to any disclaimer, the term of this patent is extended or adjusted under 35 U.S.C. 154(b) by 1120 days.

(21) Appl. No.: 17/346,882

(22) Filed: Jun. 14, 2021

(51) Int. Cl.
G06Q 10/087 (2023.01)
B65G 1/137 (2006.01)

(52) U.S. Cl.
CPC ......... B65G 1/1373 (2013.01); G06Q 10/087 (2013.01); B65G 2203/0241 (2013.01); B65G 2203/0258 (2013.01)

(58) Field of Classification Search
CPC .......... B65G 1/1373; B65G 2203/0241; B65G 2203/0258; G06Q 10/087
See application file for complete search history.

(56) References Cited

U.S. PATENT DOCUMENTS

| | | | | |
|---|---|---|---|---|
| 5,411,151 A | * | 5/1995 | Sasada | B65G 1/1373 209/912 |
| 8,855,806 B2 | * | 10/2014 | Hara | G06Q 10/08 700/216 |
| 9,280,756 B2 | * | 3/2016 | Hara | G06Q 10/087 |
| 9,558,472 B1 | * | 1/2017 | Tubilla Kuri | B25J 9/0093 |
| 11,192,719 B2 | * | 12/2021 | Lert, Jr. | B65B 69/00 |
| 11,479,379 B1 | * | 10/2022 | Gasperino | B65B 57/12 |
| 11,772,833 B1 | * | 10/2023 | Shi | B65B 5/08 700/259 |
| 2015/0324893 A1 | * | 11/2015 | Langen | B65B 43/145 705/26.81 |
| 2015/0378352 A1 | * | 12/2015 | Wetsch | B31D 5/0073 700/97 |
| 2018/0240183 A1 | * | 8/2018 | Tiilikainen | G06Q 10/087 |

* cited by examiner

Primary Examiner — Patrick H Mackey
(74) Attorney, Agent, or Firm — Athorus, PLLC

(57) ABSTRACT

Attribute-based fulfillment operations may comprise various stations and processes between inbound receive and outbound transfer that may decant, count, sort, pick, pack, and ship items based on various attributes. In order to enable such operations, accurate and reliable item counts within the system are generated and maintained at least partially automatically based on item weights. In addition, ordered or outbound items may be initially automatically sorted based on their packing types to facilitate automated packing processes, and the packages may be subsequently automatically sorted for outbound transfer based on their destinations.

14 Claims, 20 Drawing Sheets

ATTRIBUTE-BASED FULFILLMENT OPERATIONS

BACKGROUND

Many companies may receive, store, sort, pick, pack, and ship items and/or groups of items from material handling facilities. For example, many companies may receive, store, and sort items in a material handling facility, and then pick, pack, and ship items to various destinations (e.g., customers, stores, other material handling facilities) from the material handling facility. Various material handling processes may occur within a material handling facility that may have significant associated time and cost. Accordingly, there is a need for safe, reliable, efficient, and automated systems and methods to improve the various material handling processes, while also reducing the time and cost associated with such processes.

DETAILED DESCRIPTION

Figure 1:
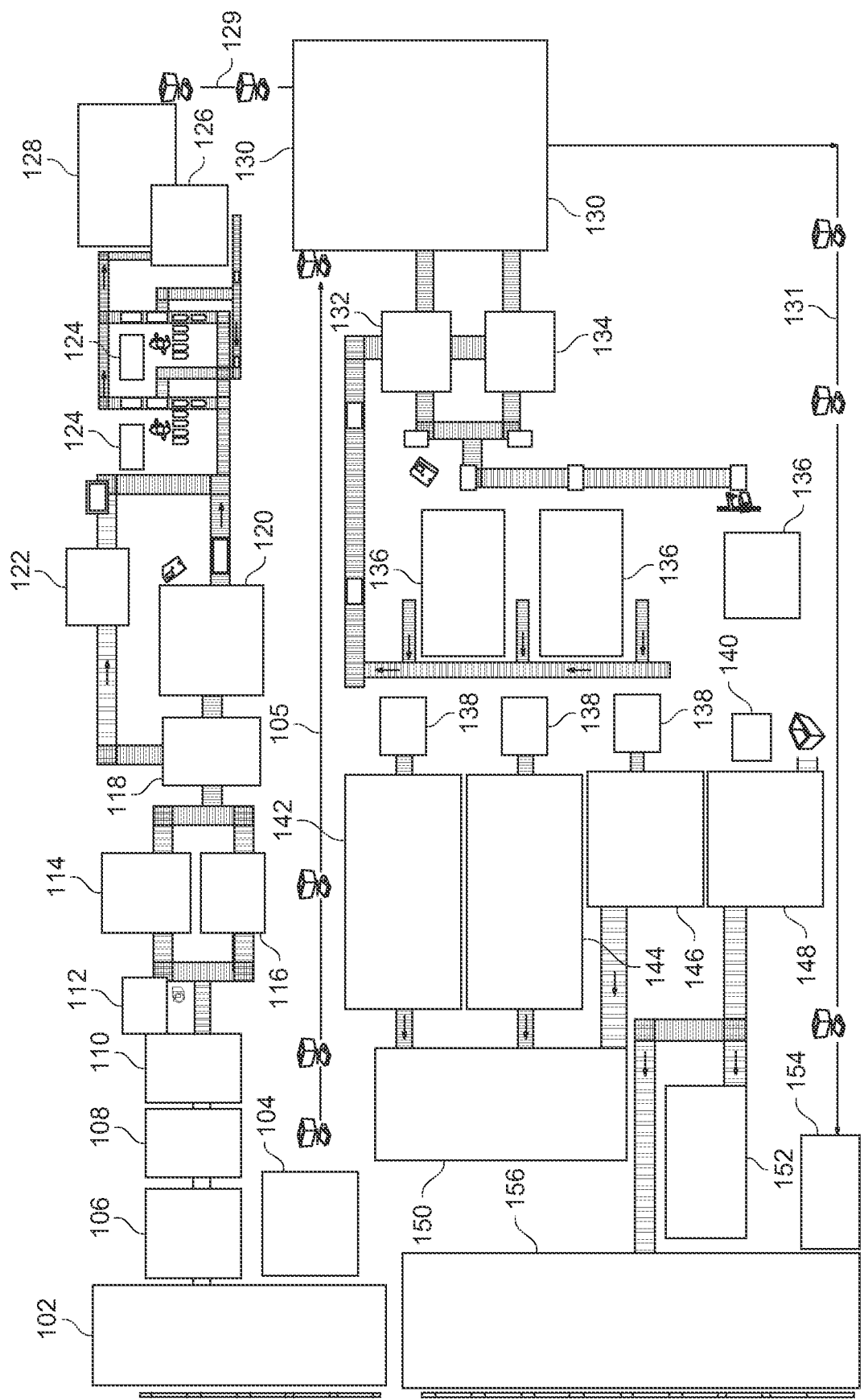
FIG. 1 is a schematic, overhead system diagram of an example fulfillment center for attribute-based fulfillment operations, in accordance with implementations of the present disclosure.

As is set forth in greater detail below, implementations of the present disclosure are directed to attribute-based fulfillment operations that are configured to receive, store, sort, pick, pack, and ship items. The items may arrive in various types of packages, such as boxes, cases, or totes, as well as pallets of boxes, cases, or totes. In addition, the items may ship in various types of packages, such as paper packages, plastic packages, corrugate packages, single item packages, multiple item packages, or totes, as well as gaylords, pallets, or other groups of paper packages, plastic packages, corrugate packages, single item packages, multiple item packages, or totes.

In example embodiments, at inbound receive, autonomous mobile robots, robotic drive units, or other types of vehicles may receive and transfer items, boxes, cases, totes, or pallets. Case depalletizers may automatically depalletize and transfer boxes or cases. Scanning tunnels or devices may automatically scan boxes or cases, and labeling devices may automatically apply labels to boxes or cases.

Imaging sensors or devices may capture imaging data of boxes or cases to determine eligibility for automated box cutting. Automated box cutters may then automatically cut eligible boxes or cases. After removal of dunnage or other packing materials, robotic arms may automatically decant items from boxes or cases to cleated conveyors. The cleated conveyors may automatically transfer decanted items to one or more transfer totes.

At item counting stations, items of the same type may be transferred to respective certified totes, such that each certified tote holds only items of a single type. Automated measurement devices may weigh the certified totes and determine an item count for each of the types of items based on item weights. The certified totes may comprise totes having known, controlled, or verified weights, dimensions, or other characteristics or attributes, such that items received by such certified totes may be accurately weighed and counted at least partially automatically.

Then, automated singulation machines may singulate each of the items from the certified totes, and automated sortation machines may sort each of the items to respective storage totes. The storage totes may receive items of only a single type, or various items of multiple types, and a tote automated storage and retrieval system may receive and store the storage totes.

In some example embodiments, rather than decanting, counting, singulating, and sorting items to storage totes, tote depalletizers may, at inbound receive, automatically depalletize, destack, and transfer totes directly to the tote automated storage and retrieval system that may receive and store the totes.

Responsive to receiving orders or requests for items, the tote automated storage and retrieval system may retrieve the storage totes having the requested items. Robotic arms may pick the requested items from the storage totes. Imaging sensors or devices may capture imaging data of picked items to identify and determine associated packing types or processes. Automated sortation machines may receive, store, and buffer the picked items based on associated packing types. Then, automated packing machines may pack the items in packages that correspond to the associated packing types.

Various automated outbound processes may then sort the packages based on associated destinations of the packages. Cross belt sorters, or other sortation systems, may sort single item packages to respective gaylords or other containers based on their associated destinations. In addition, case palletizers may automatically palletize multiple item packages based on their associated destinations. Further, autonomous mobile robots, robotic drive units, or other types of vehicles may fluidly or directly load boxes or cases to transport containers or vehicles for shipping based on their associated destinations.

In example embodiments described herein, the example fulfillment center and attribute-based fulfillment operations may sort items that have been picked based on their associated packing types first, and then may sort items that have been packed based on their associated destinations. In this manner, items may be packed substantially automatically in appropriate, right-sized packages of the correct packing type. Then, the packages may be sorted for shipping substantially automatically based on their associated destinations.

In some example embodiments, rather than retrieving storage totes and picking items from the storage totes for various automated packing and outbound processes, the tote automated storage and retrieval system may retrieve and transfer storage totes directly to tote palletizers that may automatically palletize totes based on their associated destinations.

At outbound transfer, autonomous mobile robots, robotic drive units, or other types of vehicles may receive and transfer boxes, cases, totes, gaylords, or pallets to transport containers or vehicles for shipping.

The example fulfillment center system and attribute-based fulfillment operations and processes described herein may utilize various automated machinery or equipment, sensors, measurement devices, robotic arms, automated storage and retrieval systems, automated packing systems or machines, autonomous mobile robots, robotic drive units, material handling equipment, or other substantially automated devices, machines, or processes to provide safe, reliable, efficient, and automated material handling processes that may also reduce the time and cost associated with such processes.

FIG. 1 is a schematic, overhead system diagram of an example fulfillment center, in accordance with implementations of the present disclosure.

The example fulfillment center may include inbound receive stations or processes 102. For example, at inbound receive 102, one or more trucks, trailers, trains, ships, or other transport mechanisms or containers may arrive with one or more boxes, cases, totes, or pallets thereof. In some example embodiments, boxes or cases may be palletized onto pallets, and/or totes may also be palletized onto pallets. In other example embodiments, boxes, cases, or totes may be fluid loaded into the transport containers, e.g., placed or stacked directly and individually into the transport container.

At inbound receive 102, one or more autonomous mobile robots (AMRs), robotic drive units, or other types of vehicles may receive or retrieve the boxes, cases, totes, or pallets from the transport containers. For example, the AMRs, robots, or vehicles may couple to, engage, grasp, and/or lift the boxes, cases, totes, or pallets, and then transport the boxes, cases, totes, or pallets from the transport containers to one or more tote depalletizers 104 or case depalletizers 106.

In some example embodiments, the boxes, cases, totes, or pallets may include tape, shrinkwrap, straps, covers, lids, or other components to facilitate safe and secure shipping. Various automated machines or equipment may remove the tape, shrinkwrap, straps, covers, lids, or other components at inbound receive 102, e.g., during retrieval and transport of the boxes, cases, totes, or pallets by the AMRs, robots, or vehicles to the tote depalletizers 104 or case depalletizers 106.

Although the description herein generally refers to slides, chutes, conveyors, or other material handling equipment to facilitate transfer of items, trays, boxes, cases, totes, pallets, packages, or other objects, in various example embodiments, any of the items, trays, boxes, cases, totes, pallets, packages, or other objects described herein may be transferred between or within various stations or processes of the example fulfillment center using slides, chutes, conveyors, AMRs, robots, vehicles, forklifts, pallet jacks, carts, various other types of conveyance or material handling equipment, and/or combinations thereof.

Figure 2:
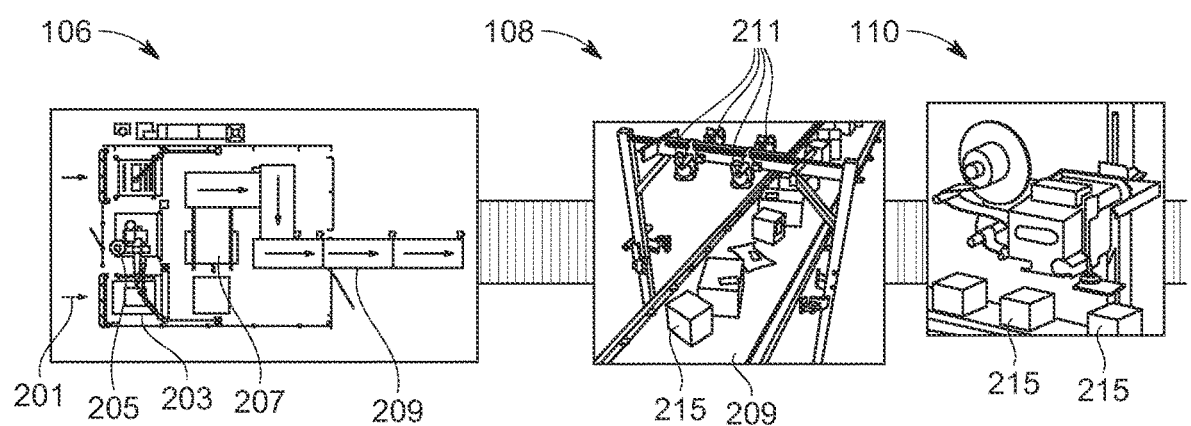
FIG. 2 is a schematic, block diagram of example case depalletizing, identification, and labeling processes of the example fulfillment center, in accordance with implementations of the present disclosure.

FIG. 2 is a schematic, block diagram of example case depalletizing, identification, and labeling processes of the example fulfillment center, in accordance with implementations of the present disclosure.

As shown in FIGS. 1 and 2, at the case depalletizers 106, the AMRs, robots, or vehicles may place pallets of boxes or cases that have been retrieved from inbound receive 102. For example, the pallets 203 of boxes or cases may be placed at an input 201 of the case depalletizers 106. One or more robotic arms 205 may grasp boxes or cases from the pallets 203 and place the boxes or cases onto one or more separation slides, chutes, conveyors, or other material handling equipment 207 to separate the boxes or cases. Then, the separated boxes or cases may be transferred downstream of the case depalletizers 106, e.g., which may comprise one or more transfer slides, chutes, conveyors, or other material handling equipment 209.

The robotic arms 205 may comprise six-axis robotic arms, other types of robotic arms, or various item grasping systems having associated end effectors. In some example embodiments, the robotic arms 205 may include six-axis robotic arms having end effectors that utilize suction or vacuum to grasp portions of boxes or cases. Further, the robotic arms 205 may grasp a plurality of boxes or cases at a time, e.g., a layer, level, or group of boxes or cases, to transfer to one or more separation conveyors 207.

In addition, a vision system including one or more imaging or scanning devices may detect edges, corners, faces, surfaces, dimensions, or other characteristics or attributes of the boxes or cases to facilitate case depalletizing. The vision system may comprise imaging sensors, cameras, infrared sensors, depth sensors, ranging or time of flight sensors, or other types of sensors. In example embodiments, the vision system may comprise cameras that capture imaging data of boxes or cases, and various computer vision or image processing algorithms to process the imaging data. For example, the computer vision or image processing algorithms may comprise edge detection, feature detection, object detection, or other types of image processing algorithms to determine size, shape, dimensions, or other similar characteristics or attributes of boxes or cases to facilitate case depalletizing.

As shown in FIGS. 1 and 2, the separated boxes or cases 215 may then be transported by the conveyors 209 through package or parcel identification stations 108. For example, the package identification stations 108 may include one or more imaging or scanning devices 211 to detect identifiers associated with the boxes or cases 215. The imaging or scanning devices 211 may comprise imaging sensors, cameras, barcode or quick response (QR) code scanners, depth sensors, infrared sensors, radiofrequency identification (RFID) readers, or other types of sensors.

In example embodiments, the imaging or scanning devices 211 may comprise barcode or QR code scanners or cameras that detect barcodes, QR codes, or other identifiers associated with individual boxes or cases 215. Based on the detected barcodes, QR codes, or other identifiers, various characteristics or attributes associated with individual boxes or cases 215 may be determined, such as source, contents, items, types, weight, dimensions, handling rules, or other characteristics or attributes.

As shown in FIGS. 1 and 2, the separated and scanned boxes or cases 215 may then be transported by the conveyors 209 through package labeling stations 110. For example, based on the detected or determined characteristics, the individual boxes or cases 215 may be labeled with various information, such as information associated with a source, expected contents or items, handling rules, downstream processing or routing, and/or other information related to processing of the boxes or cases through the example fulfillment center.

Figure 3:
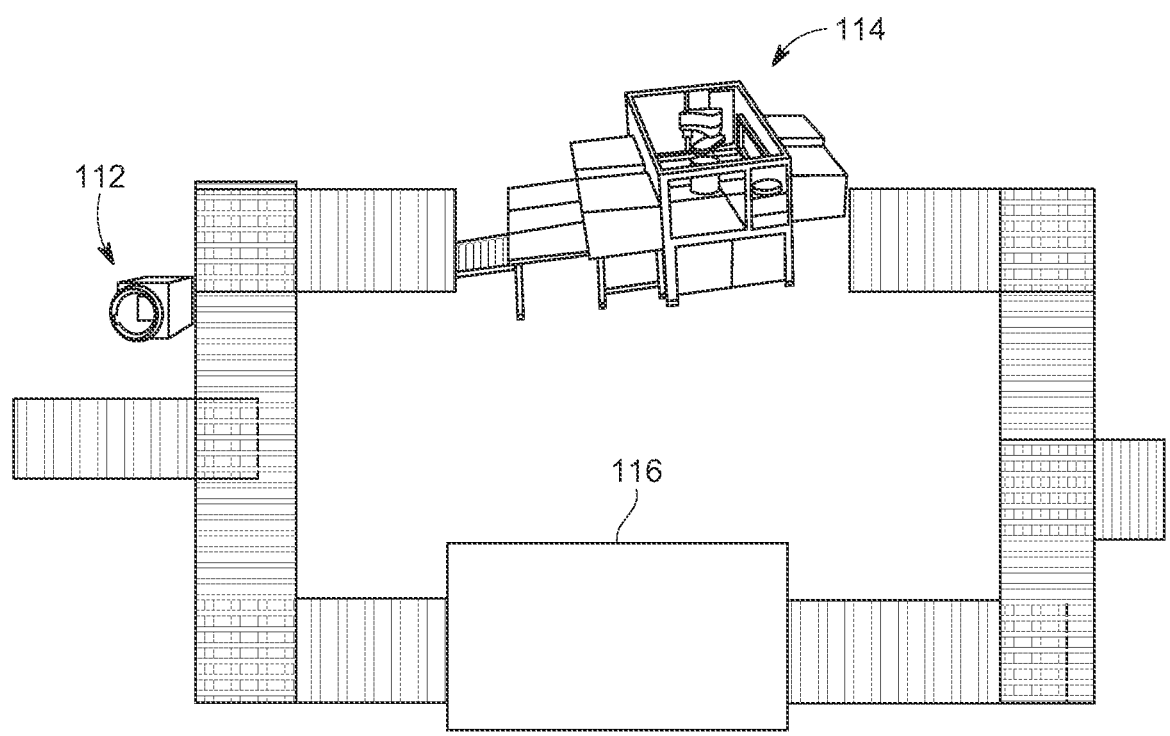
FIG. 3 is a schematic, block diagram of example case cutting processes of the example fulfillment center, in accordance with implementations of the present disclosure.

FIG. 3 is a schematic, block diagram of example case cutting processes of the example fulfillment center, in accordance with implementations of the present disclosure.

As shown in FIGS. 1 and 3, the separated, scanned, and labeled boxes and cases may then be transported by conveyors to a vision system 112. For example, the vision system 112 may include one or more imaging or scanning devices to detect edges, corners, faces, surfaces, dimensions, or other characteristics or attributes of the boxes or cases. The vision system 112 may comprise imaging sensors, cameras, infrared sensors, depth sensors, ranging or time of flight sensors, or other types of sensors.

In example embodiments, the vision system 112 may comprise cameras that capture imaging data of individual boxes or cases, and various computer vision or image processing algorithms to process the imaging data. For example, the computer vision or image processing algorithms may comprise edge detection, feature detection, object detection, or other types of image processing algorithms to determine size, shape, dimensions, seams, flaps, tapelines, or other similar characteristics or attributes of boxes or cases.

Based on the determined sizes, shapes, dimensions, or other characteristics of individual boxes or cases, a controller or control system may determine whether individual boxes or cases are eligible for automated box cutting. For example, automated box or case cutting machines or equipment may be configured to receive and automatically cut boxes or cases having particular sizes, shapes, dimensions, seams, flaps, tapelines, or other characteristics. In addition, automated box or case cutting machines or equipment may not be able to automatically cut boxes or cases that are damaged, crushed, torn, partially open, bloated or overfilled, irregularly shaped, or that exhibit other problems or anomalies.

As shown in FIGS. 1 and 3, for boxes or cases that can be automatically cut, the boxes or cases may be transferred to automated box or case cutting machines 114. Example automated box or case cutting machines may include various commercial machinery, such as Intelligent Box Opening Device (IBOD) from Lozier Corporation and Cornerstone Automation Systems, LLC (CASI) or other similar systems, machines, or equipment. The automated box or case cutting machines may cut boxes or cases in various manners, e.g., cutting along three or more edges, cutting along tape lines, or other defined cutting configurations.

As shown in FIGS. 1 and 3, for boxes or cases that cannot be automatically cut, the boxes or cases may be transferred to manual box or case cutting stations 116. For example, one or more human agents or associates may receive and cut individual boxes or cases at the manual box or case cutting stations 116.

Referring again to FIG. 1, the cut boxes or cases may then be transferred by conveyors to one or more dunnage removal and item check stations 118. For example, one or more human agents or associates may receive and open the cut boxes or cases to remove dunnage, air pillows, or other packing materials. In addition, the human agents or associates may also determine whether items in the open boxes or cases require any manual processing.

As shown in FIG. 1, for boxes or cases with items that require manual processing, the boxes or cases may be transferred by conveyors to one or more manual processing stations 122. In example embodiments, human agents or associates may perform various types of manual processing of items, such as opening packaging of items, separating groups of items, aggregating individual items, repackaging individual items or group of items, sealing individual items or groups of items, or various other manual processes. Then, the manually processed items may be placed in one or more transfer totes and moved downstream.

Figure 4:
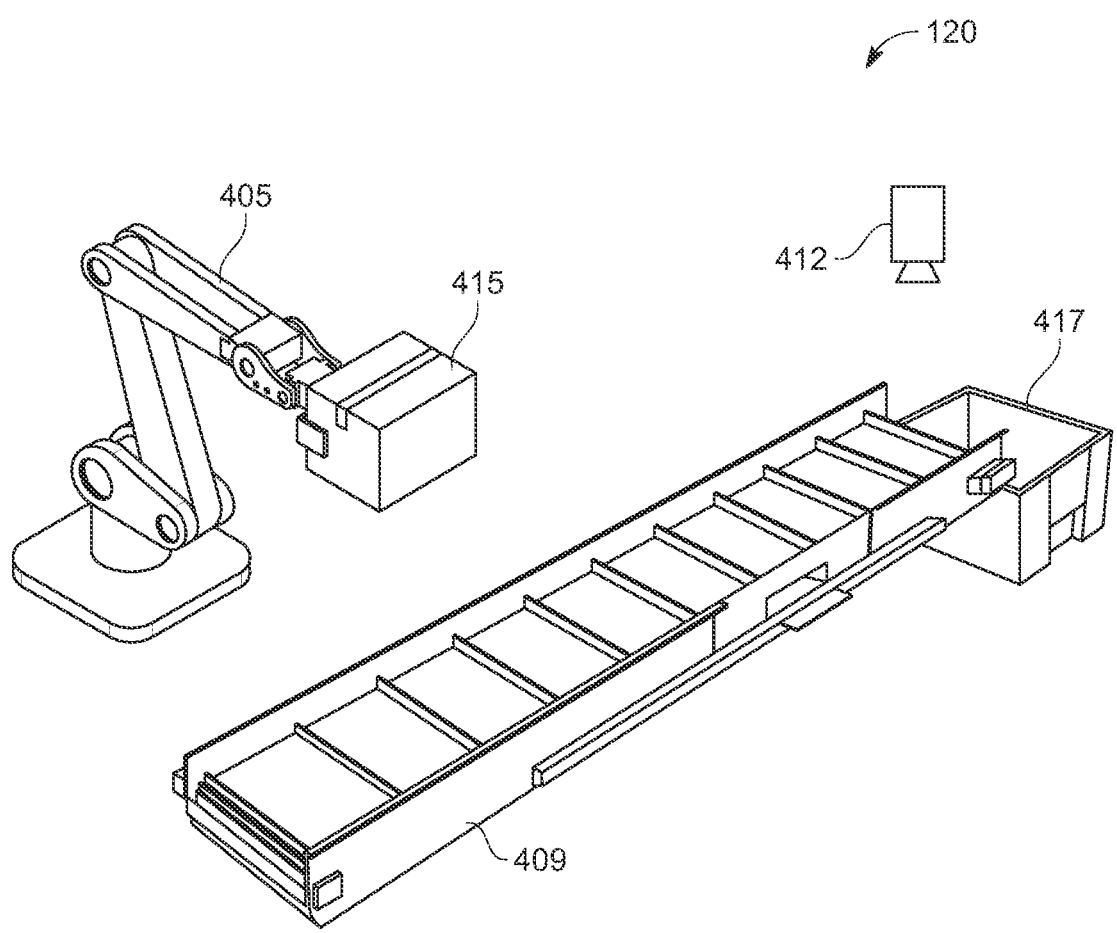
FIG. 4 is a schematic, perspective view diagram of example case decanting processes of the example fulfillment center, in accordance with implementations of the present disclosure.

FIG. 4 is a schematic, perspective view diagram of example case decanting processes of the example fulfillment center, in accordance with implementations of the present disclosure.

As shown in FIGS. 1 and 4, for boxes or cases with items that do not require manual processing, the boxes or cases may be transferred by conveyors to one or more automated case decanting stations 120. For example, one or more robotic arms 405 may grasp the open boxes or cases 415 from the conveyors, and decant, dump, empty, or otherwise place items from the boxes or cases onto one or more cleated conveyors or other material handling equipment 409. In some example embodiments, all items from an individual box or case may be decanted together into a single portion or section of a cleated conveyor between respective cleats.

In other example embodiments, items from an individual box or case may be decanted into two or more portions or sections of the cleated conveyor between respective cleats.

The robotic arms 405 may comprise six-axis robotic arms, other types of robotic arms, or various item grasping systems having associated end effectors. In some example embodiments, the robotic arms 405 may include six-axis robotic arms having end effectors that can grasp individual boxes or cases and turn or rotate to empty the boxes or cases. Further, the robotic arms 405 may empty boxes or cases individually, e.g., to transfer items therein to one or more portions or sections of cleated conveyors.

Then, the decanted items may be transferred by the cleated conveyors 409 to one or more transfer totes 417. In some example embodiments, all decanted items from an individual box or case may be transferred together into a single transfer tote 417. In other example embodiments, decanted items from an individual box or case may be transferred into two or more transfer totes 417.

During the transfer of decanted items to one or more transfer totes 417, a vision system 412 including one or more imaging or scanning devices may detect items, objects, edges, corners, faces, surfaces, dimensions, or other characteristics or attributes of the items. The vision system 412 may comprise imaging sensors, cameras, barcode or QR code scanners, RFID readers, infrared sensors, depth sensors, ranging or time of flight sensors, or other types of sensors.

In example embodiments, the vision system 412 may comprise barcode or QR code scanners or cameras that detect barcodes, QR codes, or other identifiers associated with individual items. Based on the detected barcodes, QR codes, or other identifiers, various characteristics or attributes associated with individual items may be determined, such as type, count, weight, size, shape, dimensions, handling rules, or other characteristics or attributes. In other example embodiments, the vision system 412 may comprise cameras that capture imaging data of individual items, and various computer vision or image processing algorithms to process the imaging data. For example, the computer vision or image processing algorithms may comprise item detection, object detection, edge detection, feature detection, or other types of image processing algorithms to determine size, shape, dimensions, or other similar characteristics or attributes of items.

Based on the size, shape, dimensions, weights, or other characteristics of decanted items, the transfer of items to one or more transfer totes 417 may be controlled, e.g., to ensure sufficient filling of transfer totes, and/or to prevent overfilling of transfer totes. In some example embodiments, even if a transfer tote 417 is not full, the control system may prevent transfer of items from multiple boxes or cases to a single transfer tote 417, in order to prevent unnecessary mixing that may require later sorting or separation of items from multiple boxes or cases, e.g., different types of items from different sources. In other example embodiments, the control system may cause the transfer of items from a single box or case to multiple transfer totes 417, in order to prevent overfilling and/or avoid excessive weight of any single transfer tote 417.

As discussed above, for boxes or cases with items that require processing at manual processing stations 122, instead of human agents or associates placing such items to one or more transfer totes directly, the human agents or associates may replace or maintain the processed items in the boxes or cases. Then, one or more robotic arms 405 may grasp the boxes or cases having manually processed items, and decant, dump, empty, or otherwise place the manually processed items from the boxes or cases onto one or more cleated conveyors or other material handling equipment 409. Alternatively, the human agents or associates may place the processed items onto the cleated conveyors or other material handling equipment 409 directly. Then, the detection and transfer of the items from the cleated conveyors 409 to one or more transfer totes 417 may occur substantially automatically as described with respect to FIG. 4.

Figure 5:
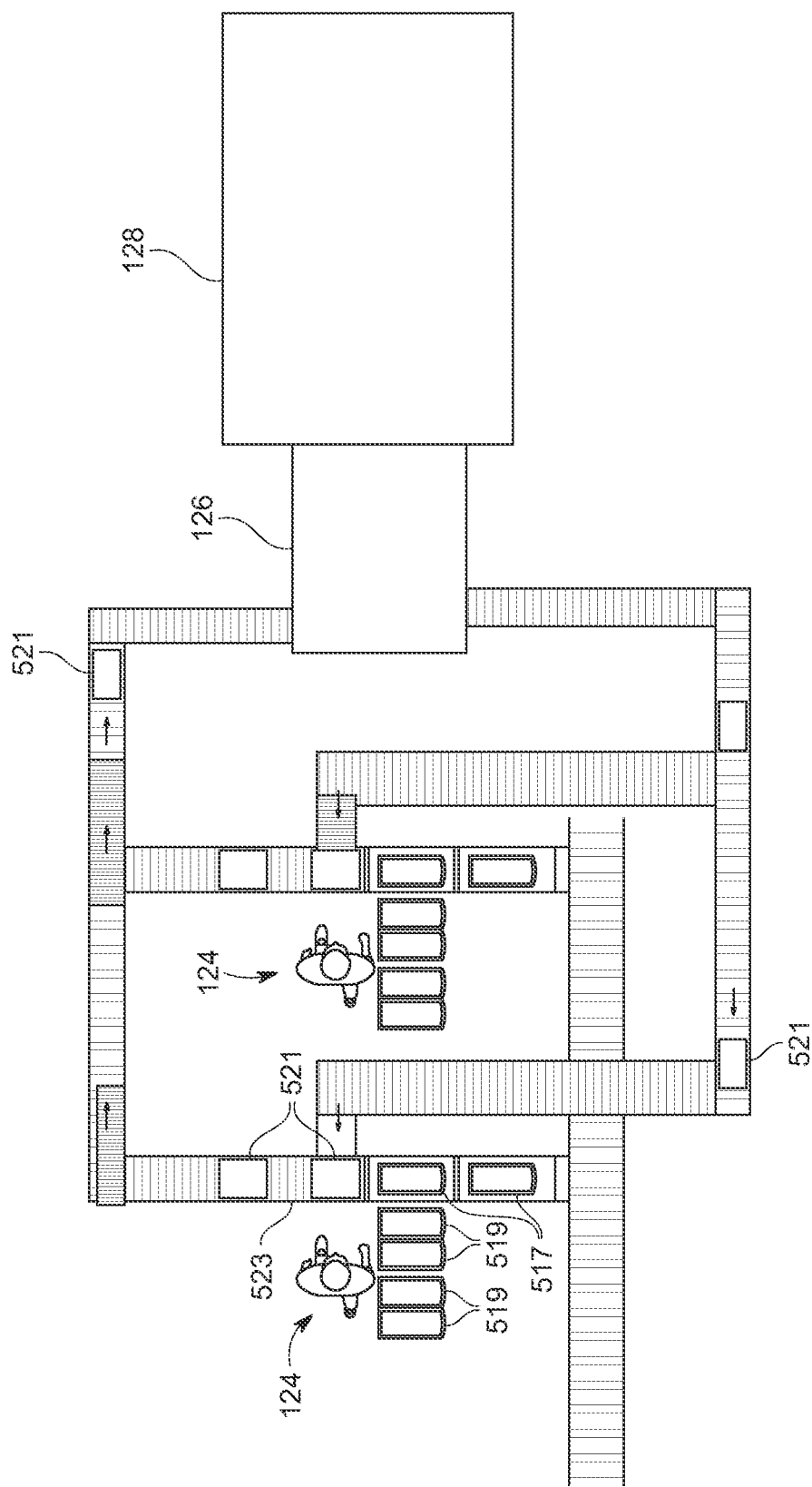
FIG. 5 is a schematic, block diagram of example item counting, singulation, and sortation processes of the example fulfillment center, in accordance with implementations of the present disclosure.

FIG. 5 is a schematic, block diagram of example item counting, singulation, and sortation processes of the example fulfillment center, in accordance with implementations of the present disclosure.

As shown in FIGS. 1 and 5, the transfer totes 517 having one or more items may be transferred by conveyors to one or more item counting stations 124. At the item counting stations 124, one or more human agents or associates may transfer items from the transfer totes 517 to one or more certified totes 521, and may also transfer empty totes 519 back to the automated case decanting stations 120 and/or manual item processing stations 122 by conveyors.

In example embodiments, at the item counting stations 124, the human agents or associates may transfer items of a single type from one or more transfer totes 517 to a single certified tote 521. The certified totes 521 may comprise totes having known, controlled, or verified weights, dimensions, or other characteristics or attributes, such that items received by such certified totes may be accurately weighed and counted at least partially automatically. In this manner, individual certified totes 521 may receive and include items of only a single, same type.

In some example embodiments, the certified totes 521 may be maintained, cleaned, inspected, or verified by removing garbage, dunnage, stickers, labels, packing materials, or various other types of extra or unwanted materials from the totes. For example, the human agents or associates may clean and/or inspect the certified totes 521 prior to or during transfer of items of a single type to such certified totes 521. In addition, the human agents or associates may perform quality checks on the items themselves during transfer, to ensure that no extra or unwanted materials are transferred to the certified totes 521 together with the items. In other example embodiments, one or more certified tote cleaning or verification stations may be included in the system, e.g., upstream of or prior to the item counting stations 124, at which one or more human agents or associates may clean and/or inspect the certified totes 521 prior to transferring such certified totes 521 to the item counting stations 124.

In further example embodiments, a vision system including one or more imaging or scanning devices may detect edges, corners, faces, surfaces, dimensions, or other characteristics or attributes of empty certified totes and/or one or more automated weight measurement devices may determine weights of totes to determine a need for cleaning or verification by human agents or associates. The vision system may comprise imaging sensors, cameras, infrared sensors, depth sensors, ranging or time of flight sensors, or other types of sensors. In example embodiments, the vision system may comprise cameras that capture imaging data of certified totes, and various computer vision or image processing algorithms to process the imaging data. For example, the computer vision or image processing algorithms may comprise edge detection, feature detection, object detection, or other types of image processing algorithms to determine size, shape, dimensions, edges, corners, faces, surfaces, objects, items, or other similar characteristics or attributes of certified totes. Responsive to detecting or identifying one or more items, objects, dimensional changes, weight changes, or other abnormalities associated with certified totes, the certified totes may be routed to certified tote cleaning or verification stations, may be routed to item counting stations 124, and/or may be marked or tagged as requiring cleaning and/or verification by human agents or associates.

After placing all items of a single type into a single certified tote 521, or after placing items of a single type into the single certified tote 521 such that the tote is not overfilled or overweight, the human agent or associate may remove one item from the certified tote 521. Then, an automated weight measurement device 523 may measure a weight of the certified tote 521 with items of the single type, e.g., at a first time with one item removed. The human agent or associate may then replace the one item back to the certified tote 521, and the automated weight measurement device 523 may measure a weight of the certified tote 521 with items of the single type, e.g., at a second time with the one item replaced.

The automated weight measurement device 523 may comprise a scale or other weight measurement device that may detect, weigh, or determine weights of certified totes 521. Because the certified totes may have known, controlled, or verified weights, dimensions, or other characteristics, weights of items received by certified totes 521 may be accurately and reliably determined based on the measured weights of the certified totes 521 and items contained therein.

In order to determine a count of items of a single type within a certified tote 521, a weight of the certified tote 521 alone may be subtracted from a total measured weight of the certified tote 521 with all items of the single type including the replaced item, to determine a total weight of all items within the certified tote 521. In addition, a difference between the total measured weight of the certified tote 521 with all items of the single type including the replaced item, and the total measured weight of the certified tote 521 with items of the single type excluding the removed item, may be determined. For example, the measured weight at the first time may be subtracted from the measured weight at the second time. The difference may comprise the weight of one item of the single type. Then, the total weight of all items within the certified tote 521 may be divided by the difference, i.e., the weight of one item, in order to determine a total number or count of items of the single type within the certified tote 521.

As described herein, an accurate and reliable count of items of a single type within certified totes 521 may be determined by ensuring, controlling, or verifying the weights, dimensions, or other characteristics of certified totes within which the items of the single type are placed and measured. Using the at least partially automated item counting stations, an accurate and reliable count of all items received and stored within the example fulfillment center may be generated and maintained, which may facilitate and enable various automated downstream stations and processes that rely on accurate data and information about types and counts of items present within the example fulfillment center.

Figure 6:
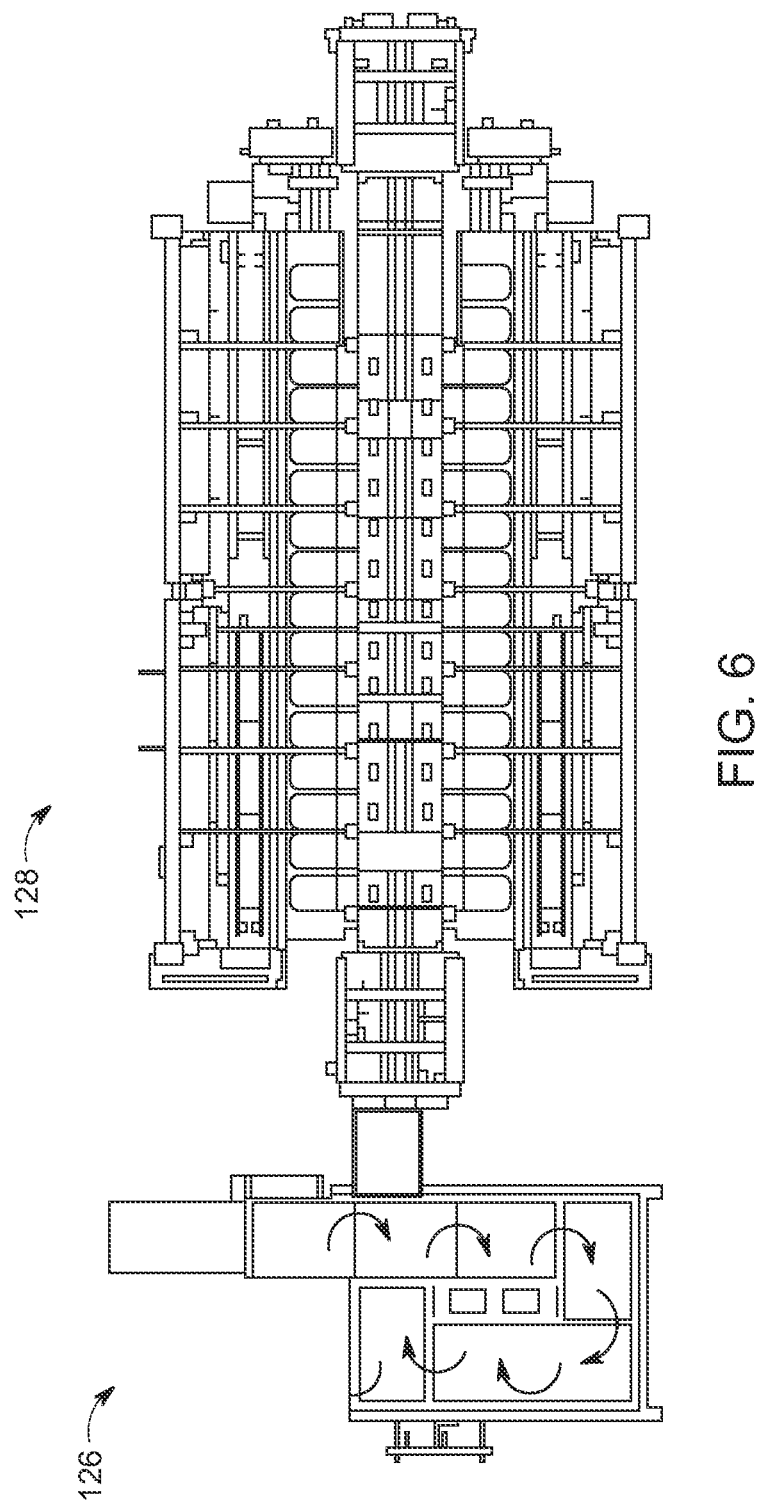
FIG. 6 is a schematic, block diagram of example item singulation and sortation processes of the example fulfillment center, in accordance with implementations of the present disclosure.

FIG. 6 is a schematic, block diagram of example item singulation and sortation processes of the example fulfillment center, in accordance with implementations of the present disclosure.

As shown in FIGS. 1, 5, and 6, from the item counting stations 124, the certified totes 521 with received and counted items may be transferred by conveyors to one or more automated item singulation machines 126 and then to one or more automated universal item sortation systems 128.

The automated item singulation machines 126 may decant, dump, empty, or otherwise place items from the certified totes onto one or more slides, chutes, conveyors, or other material handling equipment. For example, the automated item singulation machines 126 may comprise a series of or multiple slides, chutes, ramps, conveyors, belts, or other components that may move and singulate the decanted items using a series of, and/or multiple types of, motions, turns, vibrations, or other movements or actuations. Then, the singulated items may be transferred by conveyors to one or more automated universal item sortation systems 128. The certified totes that have been emptied may be transferred back by conveyors to the item counting stations 124.

The automated universal item sortation systems 128 may receive the singulated items and sort them to one or more storage totes. In some example embodiments, items of a single type may be sorted to one or more storage totes. In other example embodiments, items of multiple types may be sorted to one or more storage totes. In addition, the storage totes may be filled with items in order to be substantially full or to reach a desired weight, thereby increasing or maximizing storage density of items within the storage totes. Example universal item sortation machines may include various commercial machinery, such as OPEX universal item sortation machines or other similar systems, machines, or equipment. Further, the storage totes may be transferred downstream 129 to a tote automated storage and retrieval system by conveyors, AMRs, robots, or other material handling equipment.

Moreover, the storage totes, at various stages of operation of the example fulfillment center, may be transferred back to the automated universal item sortation systems 128 periodically to receive additional items of one or more types, thereby maintaining, increasing, or maximizing the storage density of items within storage totes. For example, after picking one or more items from a storage tote, as further described herein, the storage tote may be transferred back to the automated universal item sortation systems 128, directly or via the tote automated storage and retrieval system, to refill, consolidate, sort, redistribute, or otherwise maintain or increase storage density of items within storage totes.

In some example embodiments, a storage tote may be routed back for refilling or consolidation based on a current storage density, volume, weight, number of items, or other characteristics or attributes of the storage tote and items contained therein. In additional example embodiments, a storage tote may be routed back for refilling or consolidation based on available capacity of automated universal item sortation systems 128 to receive the storage tote and perform such refilling or consolidation. In further example embodiments, a storage tote may be routed back for refilling or consolidation based on inbound items that are to be sorted by the automated universal item sortation systems 128 to the storage tote. By refilling, consolidating, or sorting items within storage totes before the storage totes are completely empty, storage density associated with the tote automated storage and retrieval system, and the example fulfillment center as a whole, may be increased or maximized, particularly in contrast to conventional systems or processes that may refill storage totes only after the storage totes are completely empty.

Figure 7:
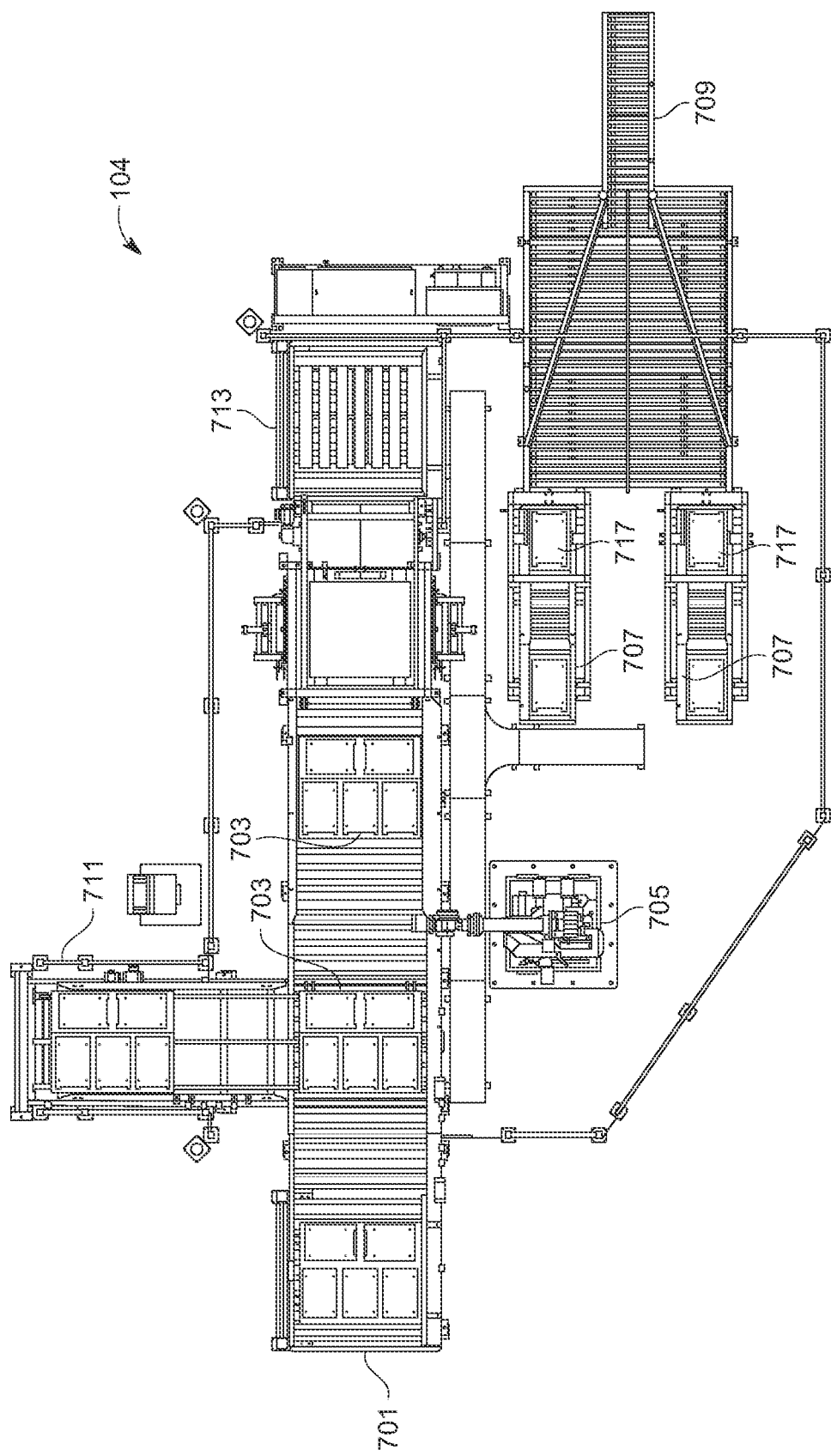
FIG. 7 is a schematic, block diagram of example tote depalletizing processes of the example fulfillment center, in accordance with implementations of the present disclosure.

FIG. 7 is a schematic, block diagram of example tote depalletizing processes of the example fulfillment center, in accordance with implementations of the present disclosure.

Referring to FIGS. 1 and 7, at the tote depalletizers 104, the AMRs, robots, or vehicles may place pallets of totes that have been retrieved from inbound receive 102. For example, the pallets 703 of totes may be placed at an input 701 of the tote depalletizers 104. One or more robotic arms 705 may grasp totes from the pallets 703 and place the totes onto one or more tote destackers or other similar machines or equipment 707 to separate the totes 717. Then, the separated totes 717 may be transferred downstream of the tote depalletizers 104, e.g., which may comprise one or more transfer slides, chutes, conveyors, or other material handling equipment 709.

In addition, empty pallets 713 may also be stacked and aggregated for use in various other stations or processes, e.g., downstream outbound processes. Further, the tote depalletizers 104 may also include problem solve sections 711 to receive pallets of totes that cannot be depalletized automatically for various reasons, e.g., incorrectly stacked totes, damaged totes, fallen totes, etc. Example tote depalletizers 104 may include various commercial machinery, such as JR Automation Robotic Tote Depalletizers or other similar systems, machines, or equipment.

The robotic arms 705 may comprise six-axis robotic arms, other types of robotic arms, or various item grasping systems having associated end effectors. In some example embodiments, the robotic arms 705 may include six-axis robotic arms having end effectors that are configured to grasp portions of totes, e.g., bases, edges, lips, or handles of totes. Further, the robotic arms 705 may grasp a plurality of totes at a time, e.g., a stack, column, or group of totes, to transfer to the one or more tote destackers 707.

In addition, a vision system including one or more imaging or scanning devices may detect edges, corners, faces, surfaces, dimensions, or other characteristics or attributes of the totes to facilitate tote depalletizing. The vision system may comprise imaging sensors, cameras, infrared sensors, depth sensors, ranging or time of flight sensors, or other types of sensors. In example embodiments, the vision system may comprise cameras that capture imaging data of totes, and various computer vision or image processing algorithms to process the imaging data. For example, the computer vision or image processing algorithms may comprise edge detection, feature detection, object detection, or other types of image processing algorithms to determine size, shape, dimensions, or other similar characteristics or attributes of totes to facilitate tote depalletizing.

The tote destackers 707 may comprise machines or equipment that can selectively engage and/or lift one or more totes, while also selectively disengaging one or more totes. For example, the tote destackers 707 may lift all totes in a stack except a lowest tote, and the lowest tote may be transferred away from the remaining stack, e.g., using one or more slides, chutes, conveyors, or other material handling equipment. In this manner, all totes 717 in a stack may be separated or destacked from each other, and then transferred downstream 105 by various material handling equipment 709. Further, the material handling equipment 709 may sort and/or realign the destacked totes into a single line, stream, or file of totes 717 for downstream transfer 105 by conveyors, AMRs, robots, or other material handling equipment.

Figure 8:
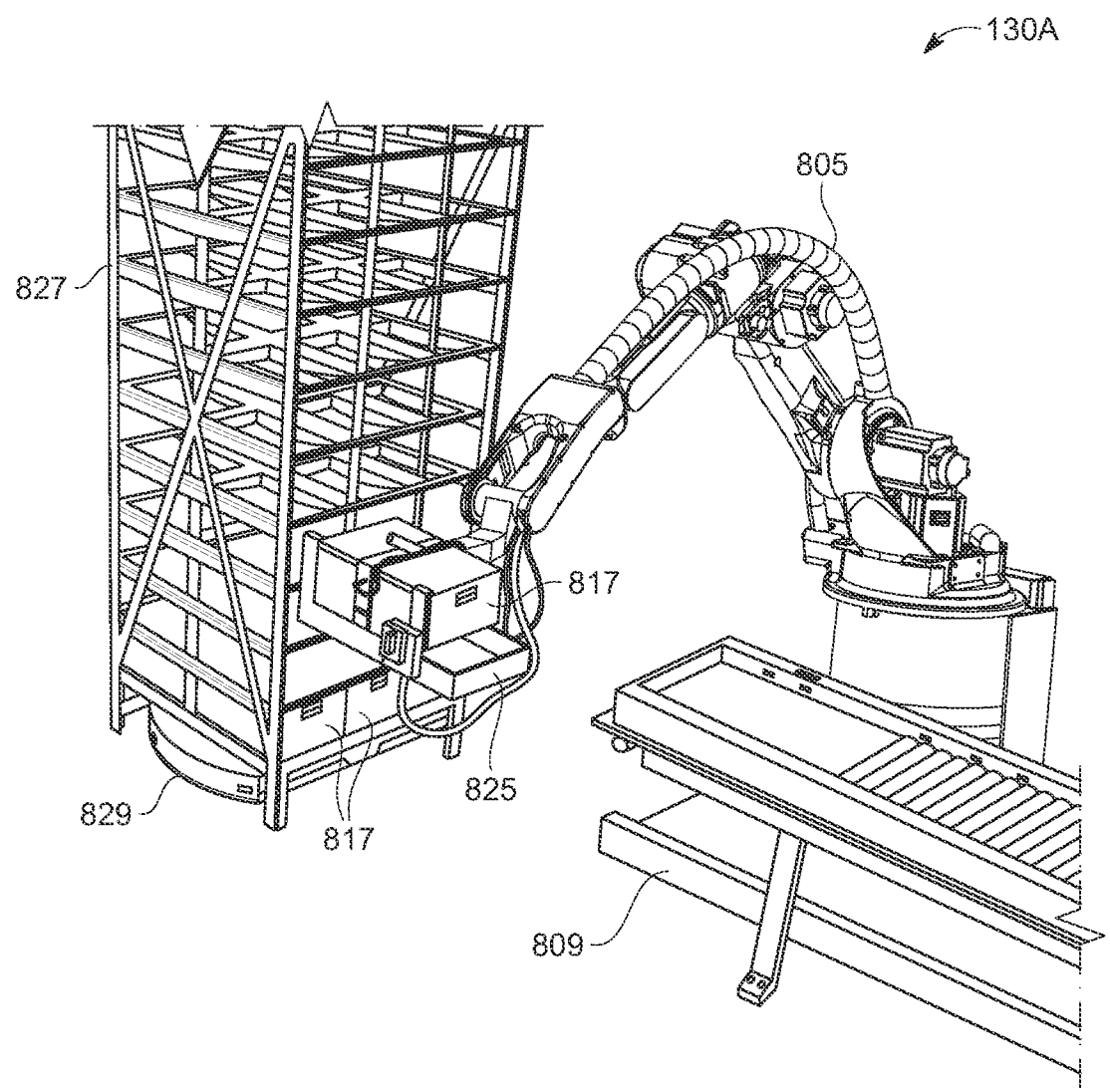
FIG. 8 is a schematic, perspective diagram of example tote storage and retrieval processes of the example fulfillment center, in accordance with implementations of the present disclosure.

FIG. 8 is a schematic, perspective diagram of example tote storage and retrieval processes of the example fulfillment center, in accordance with implementations of the present disclosure.

For example, FIG. 8 illustrates a schematic diagram of a tote transfer processes 130A of an example tote automated storage and retrieval system. In example embodiments, storage totes from the automated universal item sortation machines, e.g., as described at least with respect to FIG. 6, and/or totes from the tote depalletizers, e.g., as described at least with respect to FIG. 7, may be transferred by conveyors 809 to a tote automated storage and retrieval system.

As shown in FIGS. 1 and 8, one or more robotic arms 805 may transfer totes 817 between conveyors 809 and one or more shelves or structures 827 configured to receive and store totes 817. For example, during storage processes, the robotic arms 805 may grasp totes 817 from the conveyors 809 and place or insert the totes 817 into one or more shelves or structures 827. In addition, during retrieval processes, the robotic arms 805 may grasp totes 817 from the one or more shelves or structures 827 and place the totes 817 onto the conveyors 809.

The robotic arms 805 may comprise six-axis robotic arms, other types of robotic arms, or various item grasping systems having associated end effectors 825. In some example embodiments, the robotic arms 805 may include six-axis robotic arms having end effectors 825 that are configured to grasp or receive portions of totes, e.g., bases, edges, lips, or handles of totes. Further, the robotic arms 805 and end effectors 825 may transfer totes 817 between conveyors 809 and shelves or structures 827.

In addition, one or more AMRs, robotic drive units, or vehicles 829 may couple to, engage, grasp, lift, and/or move the shelves or structures 827 having one or more storage totes 817. In some example embodiments, the AMRs or robots 829 may travel under, engage, and/or lift the shelves or structures 827, in order to transport the shelves 827 and totes 817 within the example tote automated storage and retrieval system.

Figure 9:
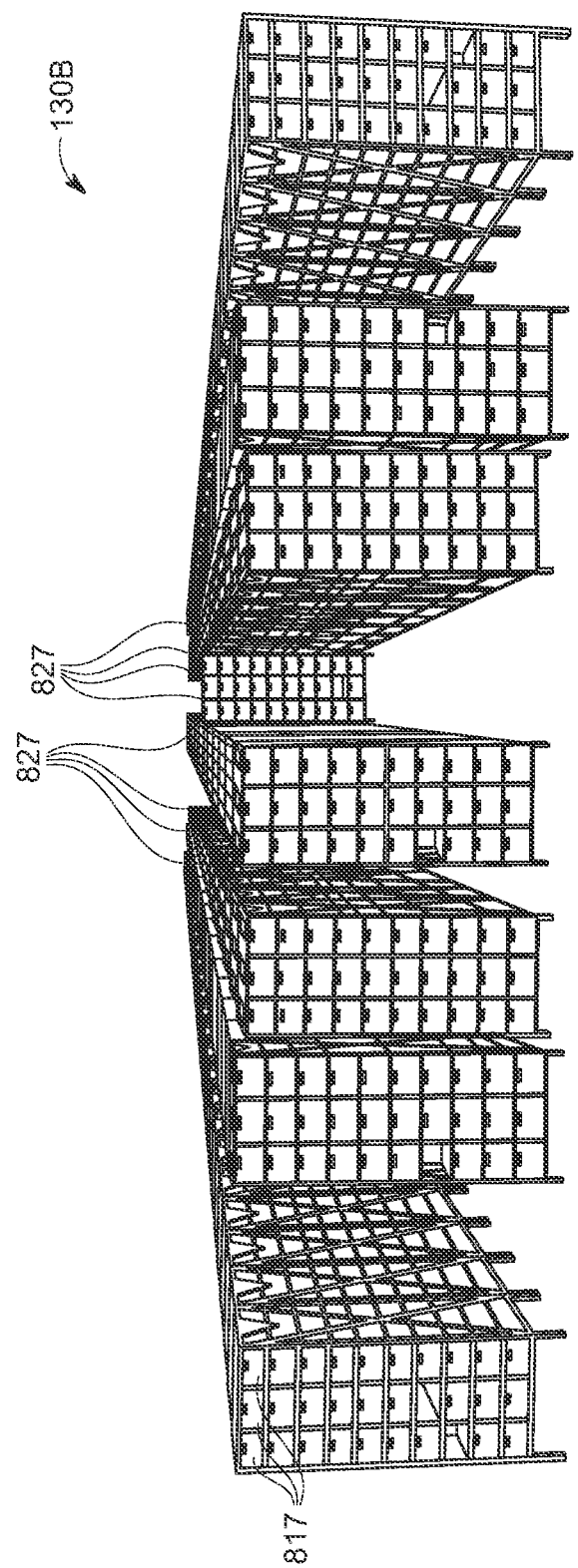
FIG. 9 is a schematic, perspective diagram of an example tote storage and retrieval system of the example fulfillment center, in accordance with implementations of the present disclosure.

FIG. 9 is a schematic, perspective diagram of an example tote storage and retrieval system of the example fulfillment center, in accordance with implementations of the present disclosure.

For example, FIG. 9 illustrates a schematic diagram of a tote storage and sortation area 130B of an example tote automated storage and retrieval system. The tote storage and sortation area 130B may comprise a region, floor, or other area within which a plurality of shelves or structures 827 having one or more storage totes 817 may be moved, placed, stored, sorted, or otherwise manipulated by one or more AMRs or robots 829. In example embodiments, the AMRs or robots 829 may navigate substantially autonomously within the tote storage and sortation area 130B, e.g., by detecting and identifying fiducial markers, barcodes, QR codes, or other identifiers on the floor, and/or by using data from various cameras, time of flight sensors, location sensors, indoor location determination systems, etc.

In addition, the various totes 817, shelves or structures 827, locations within the tote storage and sortation area 130B, and/or AMRs or robots 829 may also have associated fiducial markers, barcodes, QR codes, or other identifiers that may be captured or scanned using imaging or scanning devices or sensors. Further, data related to the various totes 817, items contained therein, shelves or structures 827, locations within the tote storage and sortation area 130B, AMRs or robots 829, and/or various associations therebetween may be stored in one or more datastores or tables. Then, with reference to the stored data of components of the example tote automated storage and retrieval system, particular items in particular totes 817 within particular shelves 827 at particular locations may be stored and retrieved accurately and efficiently by particular AMRs or robots 829 as desired.

Figure 10:
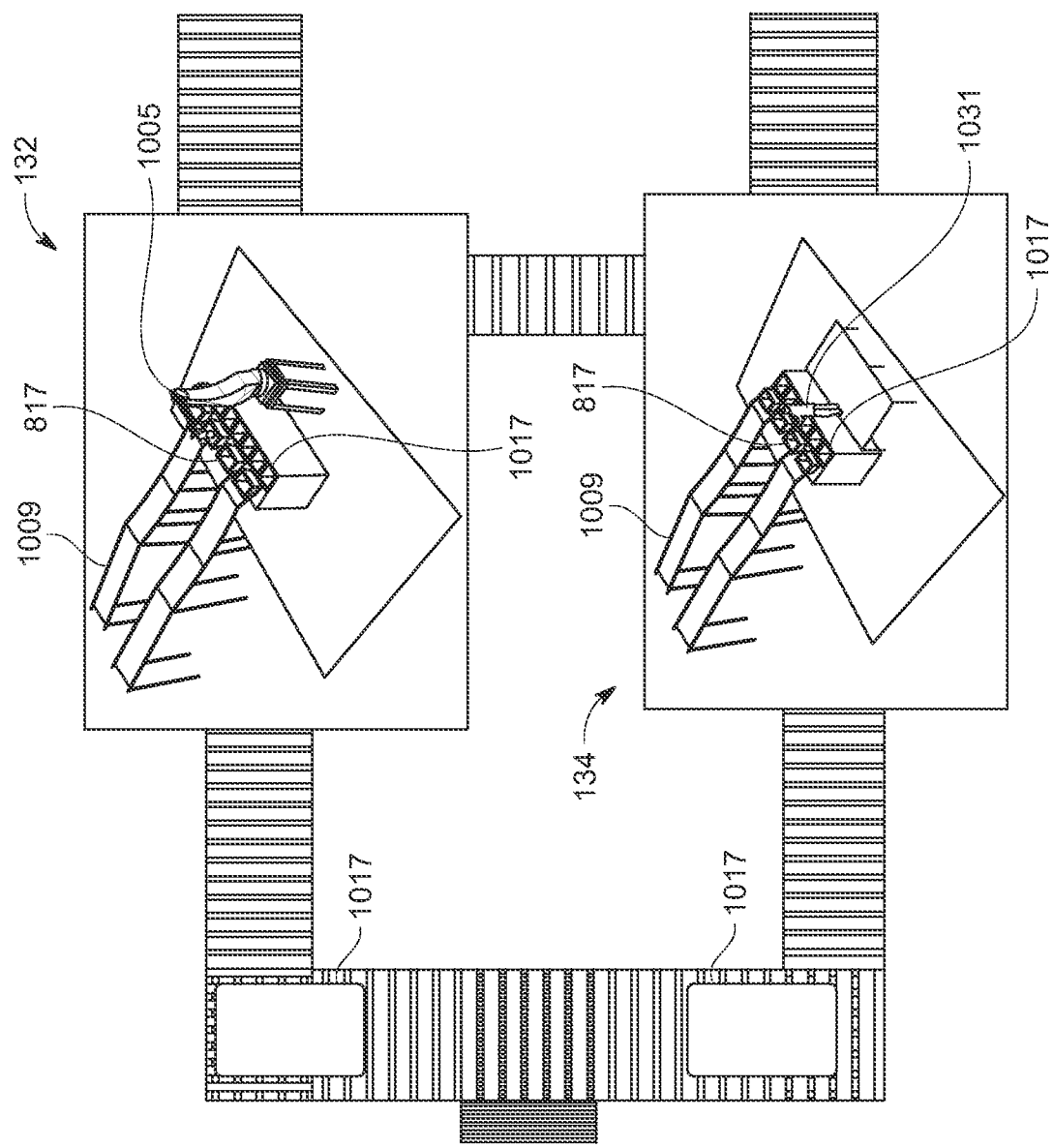
FIG. 10 is a schematic, block diagram of example item picking processes of the example fulfillment center, in accordance with implementations of the present disclosure.

FIG. 10 is a schematic, block diagram of example item picking processes of the example fulfillment center, in accordance with implementations of the present disclosure.

Upon retrieval of one or more storage totes from the example tote automated storage and retrieval system, e.g., as described at least with respect to FIGS. 8 and 9, the one or more storage totes 817 may be transferred by conveyors 1009 to one or more automated item picking stations 132 or one or more manual item picking stations 134.

As shown in FIGS. 1 and 10, in example embodiments, the one or more automated item picking stations 132 may include robotic arms 1005 and associated vision systems to grasp and transfer items from storage totes 817 to pick totes 1017. Generally, storage totes 817 having items of a single type may be transferred to the automated item picking stations 132, as the robotic arms 1005 and associated vision systems may be able to detect more efficiently and reliably individual items among a plurality of items of the same, single type within a storage tote 817, as opposed to detecting individual items among a plurality of items of multiple different types within a storage tote 817.

For example, the robotic arms 1005 may grasp and transfer items one at a time from a storage tote 817 to a pick tote 1017, such that each pick tote 1017 receives only a single item. In addition, to facilitate the grasping and transfer of individual items, a vision system including one or more imaging or scanning devices may detect items, objects, edges, corners, faces, surfaces, dimensions, or other characteristics or attributes of the items. The vision system may comprise imaging sensors, cameras, barcode or QR code scanners, RFID readers, infrared sensors, depth sensors, ranging or time of flight sensors, or other types of sensors.

In example embodiments, the vision system may comprise cameras that capture imaging data of individual items, and various computer vision or image processing algorithms to process the imaging data. For example, the computer vision or image processing algorithms may comprise item detection, object detection, edge detection, feature detection, or other types of image processing algorithms to determine size, shape, dimensions, or other similar characteristics or attributes of items.

The robotic arms 1005 may comprise six-axis robotic arms, other types of robotic arms, or various item grasping systems having associated end effectors. In some example embodiments, the robotic arms 1005 may include six-axis robotic arms having end effectors that utilize suction, vacuum, pinchers, or other gripping elements to grasp and transfer individual items from storage totes 817 to pick totes 1017.

As shown in FIGS. 1 and 10, in additional example embodiments, the one or more manual item picking stations 134 may include human agents or associates 1031 to grasp and transfer items from storage totes 817 to pick totes 1017. Generally, storage totes 817 having items of multiple different types may be transferred to the manual item picking stations 134, as the human agents or associates 1031 may be able to identify, grasp, and transfer individual items among a plurality of items of multiple different types within a storage tote 817 more efficiently and reliably than the robotic arms 1005 and associated vision systems. For example, the human agents or associates 1031 may grasp and transfer items one at a time from a storage tote 817 to a pick tote 1017, such that each pick tote 1017 receives only a single item.

Because the pick totes 1017 may be configured to receive only one item at a time, the pick totes 1017 may be sized or shaped accordingly. For example, the pick totes 1017 may have relatively smaller shapes, sizes, dimensions, or other characteristics or attributes as compared to various other totes described herein that may receive a plurality of items.

Figure 11:
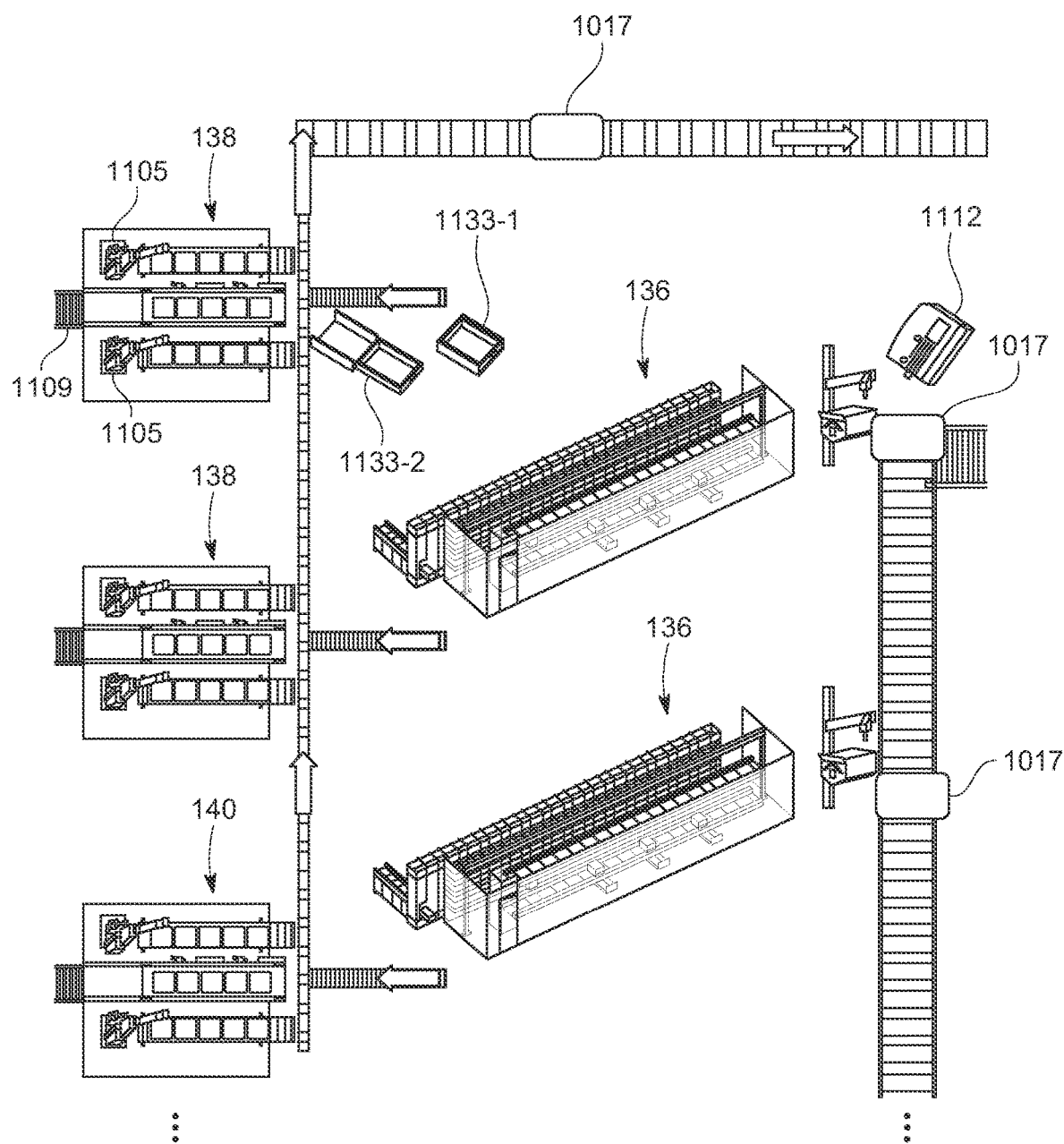
FIG. 11 is a schematic, block diagram of example item sortation by packing processes of the example fulfillment center, in accordance with implementations of the present disclosure.

FIG. 11 is a schematic, block diagram of example item sortation by packing processes of the example fulfillment center, in accordance with implementations of the present disclosure.

As shown in FIGS. 1 and 11, the one or more pick totes 1017 may be transferred by conveyors to one or more item sortation machines 136. In order to sort the pick totes 1017 to particular item sortation machines 136, a vision system 1112 including one or more imaging or scanning devices may detect items, barcodes, QR codes, RFID tags, objects, surfaces, dimensions, or other characteristics or attributes of the items. The vision system 1112 may comprise imaging sensors, cameras, barcode or QR code scanners, RFID readers, infrared sensors, depth sensors, ranging or time of flight sensors, or other types of sensors.

In example embodiments, the vision system 1112 may comprise barcode or QR code scanners or cameras that detect barcodes, QR codes, or other identifiers associated with individual items within pick totes 1017. Based on the detected barcodes, QR codes, or other identifiers, various characteristics or attributes associated with individual items may be determined, such as type, count, weight, dimensions, handling rules, packing type, or other characteristics or attributes. In other example embodiments, the vision system 1112 may comprise cameras that capture imaging data of individual items, and various computer vision or image processing algorithms to process the imaging data. For example, the computer vision or image processing algorithms may comprise item detection, object detection, edge detection, feature detection, or other types of image processing algorithms to determine size, shape, dimensions, packing type, or other similar characteristics or attributes of items.

Based at least in part on the determined packing type for individual items within pick totes 1017, the pick totes 1017 may be sorted and/or stored to particular item sortation machines 136 that are associated with the determined packing type. The packing type may comprise single item packages, multiple item packages, paper packaging, plastic packaging, corrugate packaging, other packing types, or combinations thereof.

In some example embodiments, the item sortation machines 136 may receive and store directly the pick totes 1017 having individual items. In other example embodiments, the item sortation machines 136 may receive the pick totes 1017, and transfer the individual items to trays, drawers, totes, or other containers utilized by the particular item sortation machines 136. In additional example embodiments, individual items may remain sorted and stored individually by the item sortation machines 136, e.g., for single item packages, or in further example embodiments, some individual items may be consolidated or combined for storage together with one or more additional items by the item sortation machines 136, e.g., for multiple item packages. Further, the empty pick totes 1017 may be transferred by conveyors back to the automated item picking stations 132 or manual item picking stations 134.

Some example trays or drawers of item sortation machines 136 may comprise disappearing bases or sliding drawers. For example, the trays or drawers may transition between a first configuration 1133-1 in which the walls and base of a tray form a volume to receive one or more items and a second configuration 1133-2 in which the walls and base of a tray move relative to each other to release or drop one or more items out of the tray. As shown in FIG. 11, at least a portion of the walls of a tray may move relative to the base to slide and drop one or more items off or out of the base. One or more other totes, trays, containers, chutes, slides, conveyors, or other material handling equipment, which may be utilized by the particular downstream automated packing machines, e.g., as described at least with respect to FIG. 12, may then receive the released or dropped items.

Example automated item sortation machines may include various commercial machinery, such as OPEX item sortation machines or other similar systems, machines, or equipment.

Upon determining to pack one or more items, the items may be retrieved from the item sortation machines 136 and moved to automated packing machines via transfer stations 138, 140. For example, the pick totes 1017 may be removed from the item sortation machines 136 and transferred by conveyors to downstream automated packing machines. In addition, items may be removed, released, or dropped from the item sortation machines 136 into one or more other totes, trays, containers, chutes, slides, conveyors, or other material handling equipment, which may then be transferred by conveyors to downstream automated packing machines.

In some example embodiments, one or more robotic arms 1105 at transfer stations 138 may grasp totes, trays, or containers having one or more items to be packed, and may transfer, dump, or empty the totes, trays, or containers onto cleated conveyors or other material handling equipment 1109. For example, the robotic arms 1105 may comprise six-axis robotic arms, other types of robotic arms, or various item grasping systems having associated end effectors. In some example embodiments, the robotic arms 1105 may include six-axis robotic arms having end effectors that utilize suction, vacuum, pinchers, or other gripping elements to grasp, lift, and empty one or more items from totes, trays, or containers onto cleated conveyors 1109 for transfer to downstream automated packing machines.

In additional example embodiments, items that have been removed, released, or dropped from the item sortation machines 136 into one or more other totes, trays, or containers may be transferred by conveyors via transfer stations 140 directly to downstream automated packing machines. For example, some automated packing machines may utilize specially designed or configured totes, trays, or containers to facilitate automatic packaging. Thus, some transfer stations 140 may be configured to move such specialized totes, trays, or containers that have received one or more items from item sortation machines 136 directly to respective automated packing machines.

Multiple item sortation machines 136 may be included within the example fulfillment center described herein. In some example embodiments, individual item sortation machines 136 may receive, store, buffer, sort, consolidate, and release items to a respective, dedicated automated packing machine. In additional example embodiments, one or more item sortation machines 136 may receive, store, buffer, sort, consolidate, and release items to one or more respective automated packing machines. Generally, each item sortation machine 136 may be associated with a particular packing type, e.g., single item packages, multiple item packages, paper packaging, plastic packaging, corrugate packaging, other packing types, or combinations thereof.

Figure 12:
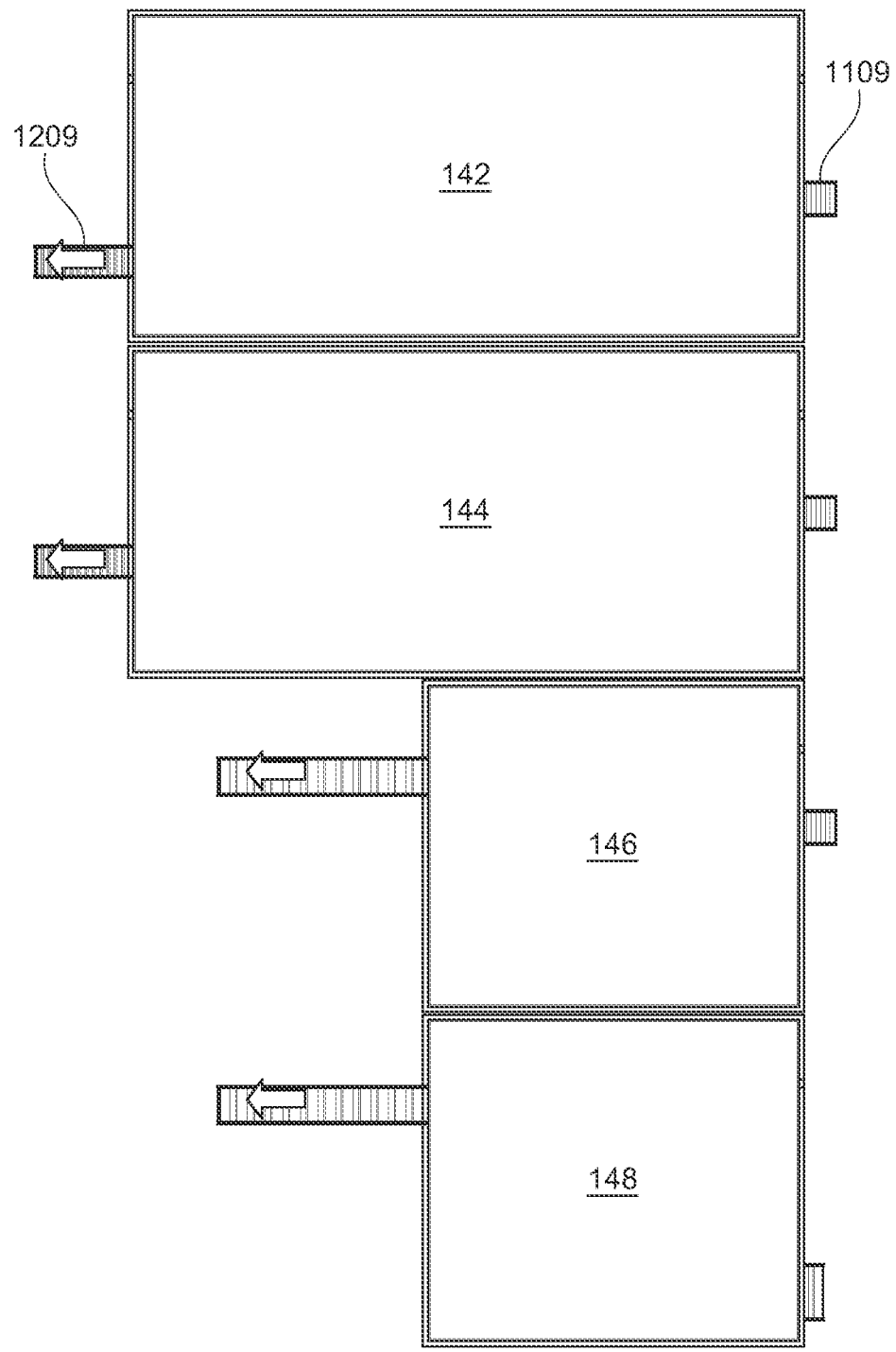
FIG. 12 is a schematic, block diagram of example packing processes of the example fulfillment center, in accordance with implementations of the present disclosure.

FIG. 12 is a schematic, block diagram of example packing processes of the example fulfillment center, in accordance with implementations of the present disclosure.

As shown in FIGS. 1 and 12, items to be packed may be transferred by conveyors 1109 to one or more automated packing machines 142, 144, 146, 148. As described at least with respect to FIG. 11, the items may have been previously sorted by automated item sortation machines 136 based on determined packing types. From the automated item sortation machines 136, the items may be routed to respective automated packing machines 142, 144, 146, 148 that are associated with the determined packing types.

In the example illustrated in FIG. 12, the automated packing machine 142 may comprise a single item, paper packaging machine. For example, the automated packing machine 142 may receive items individually, e.g., by a conveyor, cleated conveyor, or other material handling equipment, and automatically package the items individually in paper packaging, which may be padded or unpadded paper packaging. Example automated paper packing machines may include various commercial machinery, such as SITMA automated paper packaging machines or other similar systems, machines, or equipment.

In addition, the automated packing machine 144 may comprise a single item, plastic packaging machine. For example, the automated packing machine 144 may receive items individually, e.g., by a conveyor, cleated conveyor, or other material handling equipment, and automatically package the items individually in plastic packaging, which may be padded or unpadded plastic packaging. Example automated plastic packing machines may include various commercial machinery, such as SmartPac automated plastic packaging machines or other similar systems, machines, or equipment.

Further, the automated packing machine 146 may comprise a single item, corrugate packaging machine. For example, the automated packing machine 146 may receive items individually, e.g., by a conveyor, cleated conveyor, or other material handling equipment, and automatically package the items individually in corrugate packaging. Example automated corrugate packing machines may include various commercial machinery, such as CMC Machinery CartonWrap automated corrugate packaging machines or other similar systems, machines, or equipment.

Moreover, the automated packing machine 148 may comprise a multiple item, corrugate packaging machine. For example, the automated packing machine 148 may receive a group of items, e.g., by a tote, tray, container, conveyor, cleated conveyor, or other material handling equipment, and automatically package the group of items together in corrugate packaging. Example automated corrugate packing machines may include various commercial machinery, such as CMC Machinery Genesys automated corrugate packaging machines that use specially designed or configured totes, i.e., Varytotes, or other similar systems, machines, or equipment.

Multiple automated packing machines may be included within the example fulfillment center described herein. In example embodiments, individual automated packing machines may receive items to be packed from one or more item sortation machines associated with the determined packing type. Generally, the various packing types of individual automated packing machines may include single item packages, multiple item packages, paper packaging, plastic packaging, corrugate packaging, other packing types, or combinations thereof.

In example embodiments, the automated packing machines may also apply labels or other information, including barcodes, QR codes, or other identifiers, in order to facilitate downstream sortation and transfer operations based on identifications of packages. The identifiers may encode or be associated with various information of the packages, including identity, order, destination, contents, size, shape, dimensions, weight, or other characteristics or attributes. The packages of items from the automated packing machines may then be routed by conveyors or other material handling equipment 1209 to various downstream, automated outbound processes, e.g., as described at least with respect to FIGS. 13 and 14.

Figure 13:
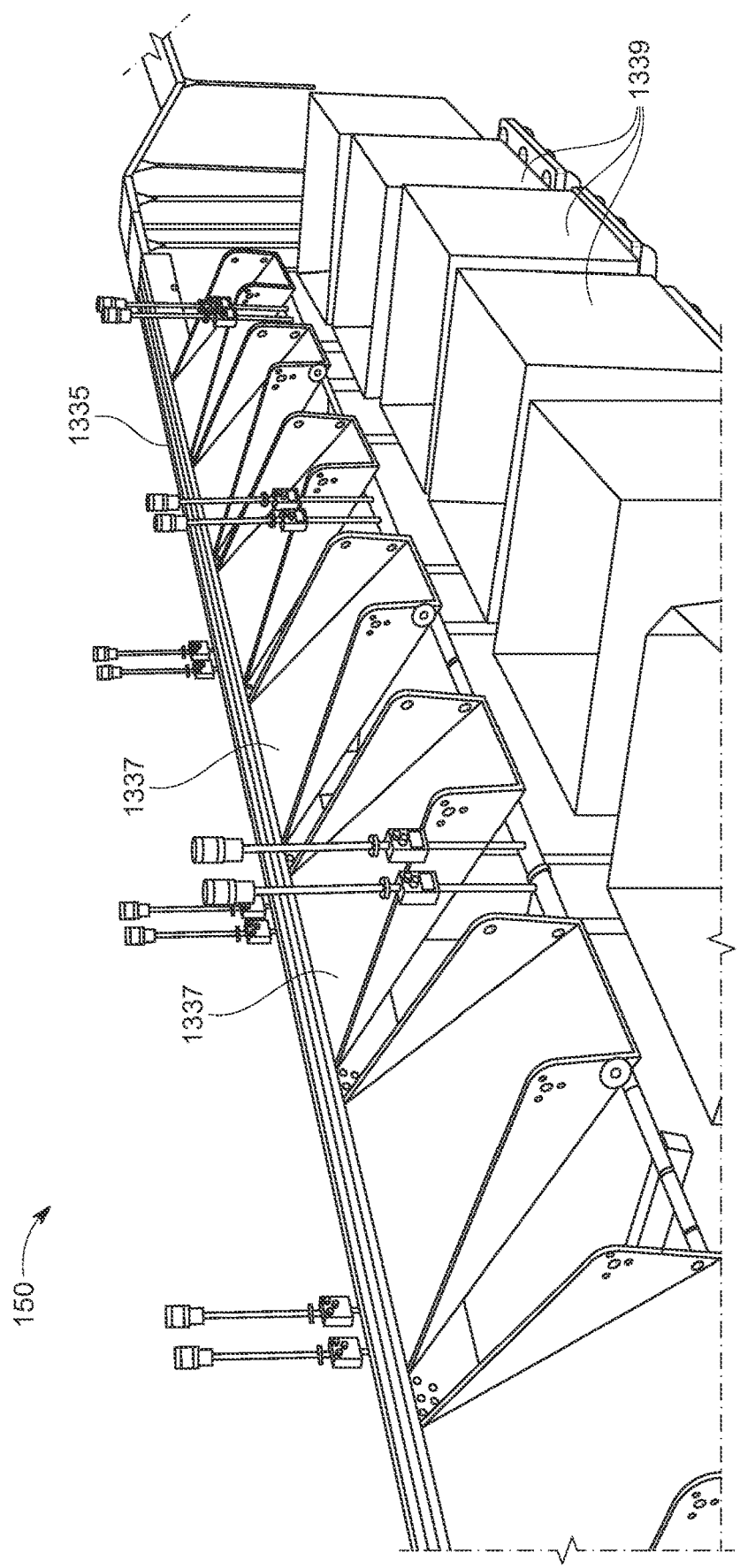
FIG. 13 is a schematic, perspective view diagram of example sortation by destination processes of the example fulfillment center, in accordance with implementations of the present disclosure.

FIG. 13 is a schematic, perspective view diagram of example sortation by destination processes of the example fulfillment center, in accordance with implementations of the present disclosure.

As shown in FIGS. 1 and 13, various packages from the automated packing machines may be transferred by conveyors for sortation by destination 150. For example, each package may have a destination associated with the item or group of items contained therein. The packages may be moved or transferred by a cross belt sorter 1335 via respective chutes, ramps, or slides 1337 and sorted to various gaylords or other containers 1339 having associated destinations. Generally, the packages that may be transferred and sorted using the cross belt sorter 1335 and chutes 1337 to gaylords 1339 may comprise single item packages, whether packed in paper, plastic, corrugate, or other packaging materials.

In addition, a vision system including one or more imaging or scanning devices may detect barcodes, QR codes, other identifiers, or other characteristics or attributes of packages to facilitate sortation. The vision system may comprise imaging sensors, cameras, barcode or QR code scanners, infrared sensors, depth sensors, ranging or time of flight sensors, or other types of sensors. In example embodiments, the vision system may comprise cameras that capture identifiers of packages, and various computer vision or image processing algorithms to process the identifiers. For example, the computer vision or image processing algorithms may comprise item detection, object detection, or other types of image processing algorithms to determine identity, order, destination, contents, size, shape, dimensions, weight, or other similar characteristics or attributes of packages to facilitate sortation.

Upon filling the gaylords 1339 with packages, and/or upon reaching transport or shipping times associated with the gaylords 1339, one or more AMRs, robots, or vehicles may couple to, engage, lift, and/or move the gaylords 1339 to outbound transfer 156. Finally, at outbound transfer 156, one or more AMRs, robots, or vehicles may couple to, engage, lift, and/or move the gaylords 1339 to one or more transport or freight containers for shipping.

In some example embodiments, the gaylords may be wrapped, covered, or secured using tape, shrinkwrap, straps, covers, lids, or other components to facilitate safe and secure shipping. Various automated machines or equipment may add the tape, shrinkwrap, straps, covers, lids, or other components at outbound transfer 156, e.g., during retrieval and transport of the gaylords by the AMRs, robots, or vehicles to various outbound shipping systems or processes.

Figure 14:
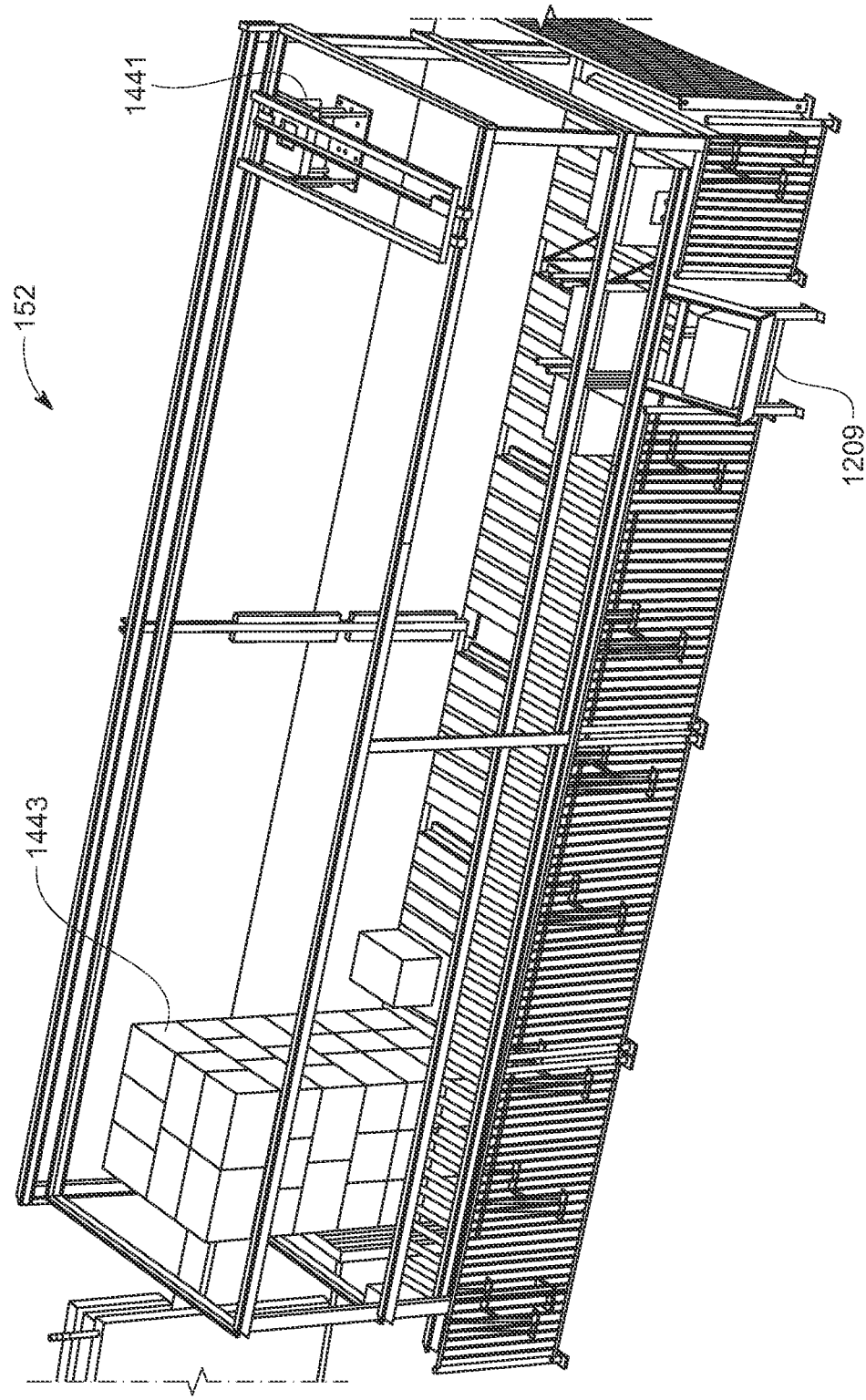
FIG. 14 is a schematic, perspective view diagram of example case palletizing processes of the example fulfillment center, in accordance with implementations of the present disclosure.

FIG. 14 is a schematic, perspective view diagram of example case palletizing processes of the example fulfillment center, in accordance with implementations of the present disclosure.

As shown in FIGS. 1 and 14, various packages from the automated packing machines may be transferred by conveyors to one or more case palletizers 152. For example, each package may have a destination associated with the item or group of items contained therein. The case palletizers 152 may receive packages transferred by conveyors or other material handling equipment 1209 and may stack or palletize the packages using one or more overhead gantry systems 1441 into one or more pallets 1443 having associated destinations. Generally, the packages that may be transferred and palletized using the case palletizers 152 may comprise multiple item packages, which may be packed in corrugate or other packaging materials.

The gantry systems 1441 of the case palletizers 152 may grasp packages having one or more packed items, and may stack, build, and palletize the packages into one or more pallets 1443 having associated destinations. Generally, all packages that are palletized together may have a same associated destination. For example, the gantry systems 1441 may have three or more degrees of freedom of movement, e.g., along x, y, and z axes, and may have associated end effectors to grasp, lift, move, and/or place packages. In some example embodiments, the gantry systems 1441 may include end effectors that utilize suction, vacuum, pinchers, or other gripping elements to grasp, lift, move, and/or place packages from conveyors or other material handling equipment 1209 to one or more pallets 1443.

In addition, a vision system including one or more imaging or scanning devices may detect barcodes, QR codes, other identifiers, sizes, shapes, dimensions, weights, or other characteristics or attributes of packages to facilitate palletizing. The vision system may comprise imaging sensors, cameras, barcode or QR code scanners, infrared sensors, depth sensors, ranging or time of flight sensors, or other types of sensors. In example embodiments, the vision system may comprise cameras that capture imaging data and/or identifiers of packages, and various computer vision or image processing algorithms to process the imaging data and/or identifiers. For example, the computer vision or image processing algorithms may comprise item detection, object detection, edge detection, surface detection, feature detection, or other types of image processing algorithms to determine identity, order, destination, contents, size, shape, dimensions, weight, or other similar characteristics or attributes of packages to facilitate palletizing.

Upon building the pallets 1443 with packages, and/or upon reaching transport or shipping times associated with the pallets 1443, one or more AMRs, robots, or vehicles may couple to, engage, lift, and/or move the pallets 1443 to outbound transfer 156. Finally, at outbound transfer 156, one or more AMRs, robots, or vehicles may couple to, engage, lift, and/or move the pallets 1443 to one or more transport or freight containers for shipping. In other example embodiments, packages may be fluid loaded into the transport containers, e.g., placed or stacked directly and individually into transport containers by AMRs, robots, or vehicles without stacking or building pallets 1443 of packages.

In some example embodiments, the pallets 1443 may be wrapped, covered, or secured using tape, shrinkwrap, straps, covers, lids, or other components to facilitate safe and secure shipping. Various automated machines or equipment may add the tape, shrinkwrap, straps, covers, lids, or other components at outbound transfer 156, e.g., during retrieval and transport of the pallets 1443 by the AMRs, robots, or vehicles to various outbound shipping systems or processes.

Figure 15:
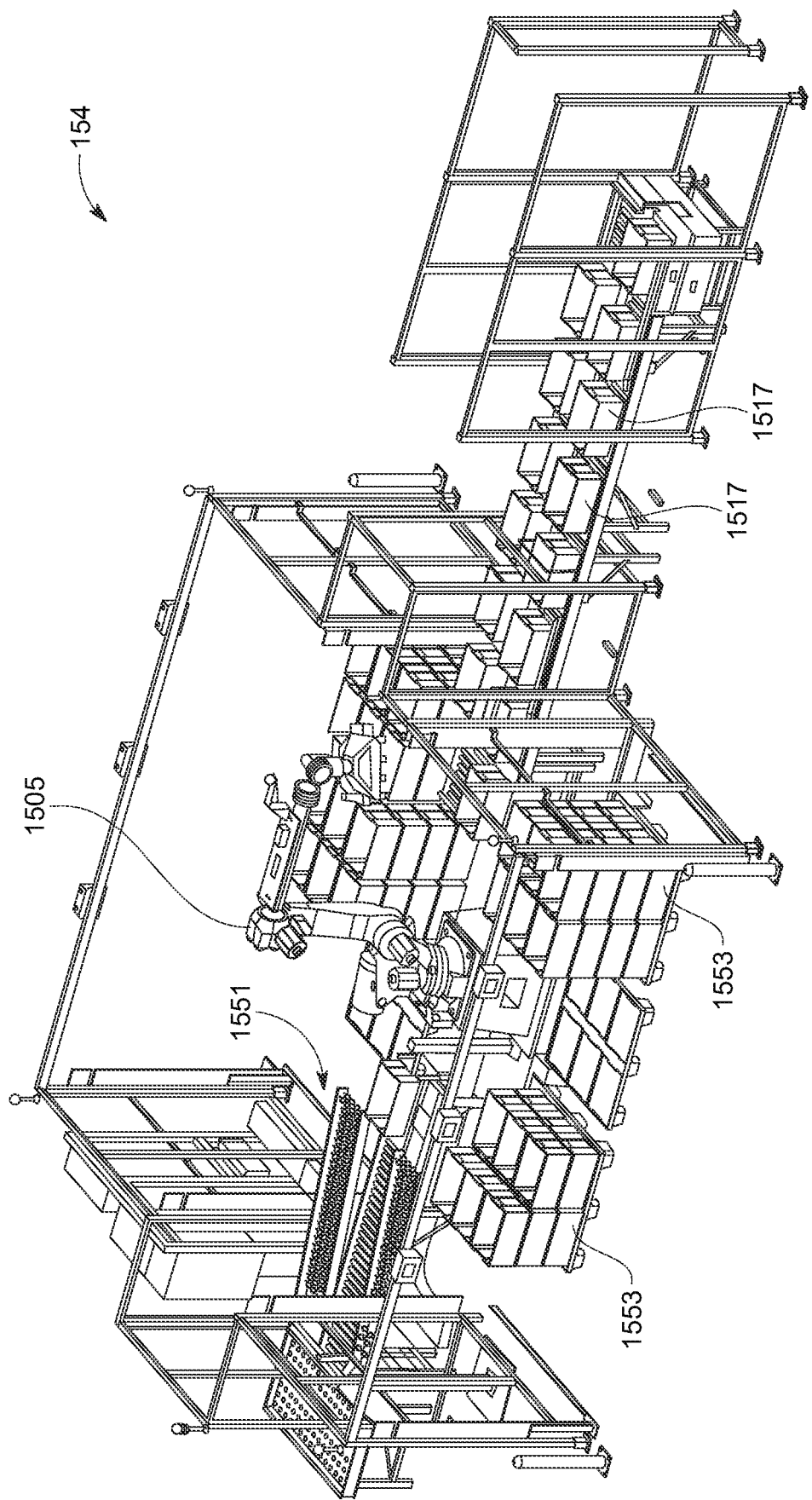
FIG. 15 is a schematic, perspective view diagram of example tote palletizing processes of the example fulfillment center, in accordance with implementations of the present disclosure.

FIG. 15 is a schematic, perspective view diagram of example tote palletizing processes of the example fulfillment center, in accordance with implementations of the present disclosure.

Referring to FIGS. 1 and 15, upon retrieval of one or more storage totes from the example tote automated storage and retrieval system, e.g., as described at least with respect to FIGS. 8 and 9, the one or more totes may be transferred downstream 131 by conveyors, AMRs, robots, or other material handling equipment to one or more tote palletizers 154. Such totes 1517 may be transferred downstream 131 directly from the tote automated storage and retrieval system to tote palletizers 154, e.g., if items within such totes are to be shipped to destinations directly within such totes without additional picking, packing, sorting, or other processing of individual items described herein. Each tote may have a destination associated with the item or group of items contained therein.

At the tote palletizers 154, one or more robotic arms 1505 may grasp one or more totes 1517, and may stack, build, and palletize the totes 1517 onto one or more pallets 1553 of totes having associated destinations. Generally, all totes that are palletized together may have a same associated destination. The robotic arms 1505 may comprise six-axis robotic arms, other types of robotic arms, or various item grasping systems having associated end effectors. In some example embodiments, the robotic arms 1505 may include six-axis robotic arms having end effectors that are configured to grasp, lift, move, and/or place totes via portions of totes, e.g., bases, edges, lips, or handles of totes. Further, the robotic arms 1505 may grasp a plurality of totes at a time, e.g., a stack, column, layer, level, or group of totes, to stack and build the one or more pallets 1553 of totes.

Moreover, the tote palletizers 154 may also include a problem solve section 1551 to receive totes that cannot be palletized automatically for various reasons, e.g., unidentified totes, damaged totes, empty totes, totes with associated destinations that do not correspond to destinations of any available pallets, etc. Alternatively, the problem solve section 1551 may be utilized as a buffer, staging, or storage area for totes 1517 to facilitate palletizing processes, e.g., in order to stage lighter totes while heavier totes are stacked first, in order to sort or buffer totes according to associated destinations, or for various other purposes.

In addition, a vision system including one or more imaging or scanning devices may detect barcodes, QR codes, other identifiers, sizes, shapes, dimensions, weights, or other characteristics or attributes of totes to facilitate palletizing. The vision system may comprise imaging sensors, cameras, barcode or QR code scanners, infrared sensors, depth sensors, ranging or time of flight sensors, or other types of sensors. In example embodiments, the vision system may comprise cameras that capture imaging data and/or identifiers of totes, and various computer vision or image processing algorithms to process the imaging data and/or identifiers. For example, the computer vision or image processing algorithms may comprise item detection, object detection, edge detection, surface detection, feature detection, or other types of image processing algorithms to determine identity, order, destination, contents, size, shape, dimensions, weight, or other similar characteristics or attributes of totes to facilitate palletizing.

Upon building the pallets 1553 of totes, and/or upon reaching transport or shipping times associated with the pallets 1553, one or more AMRs, robots, or vehicles may couple to, engage, lift, and/or move the pallets 1553 to outbound transfer 156. Finally, at outbound transfer 156, one or more AMRs, robots, or vehicles may couple to, engage, lift, and/or move the pallets 1553 to one or more transport or freight containers for shipping. In other example embodiments, totes may be fluid loaded into the transport containers, e.g., placed or stacked directly and individually into transport containers by AMRs, robots, or vehicles without stacking or building pallets 1553 of totes.

In some example embodiments, the pallets 1553 may be wrapped, covered, or secured using tape, shrinkwrap, straps, covers, lids, or other components to facilitate safe and secure shipping. Various automated machines or equipment may add the tape, shrinkwrap, straps, covers, lids, or other components at outbound transfer 156, e.g., during retrieval and transport of the pallets 1553 by the AMRs, robots, or vehicles to various outbound shipping systems or processes.

Figure 16:
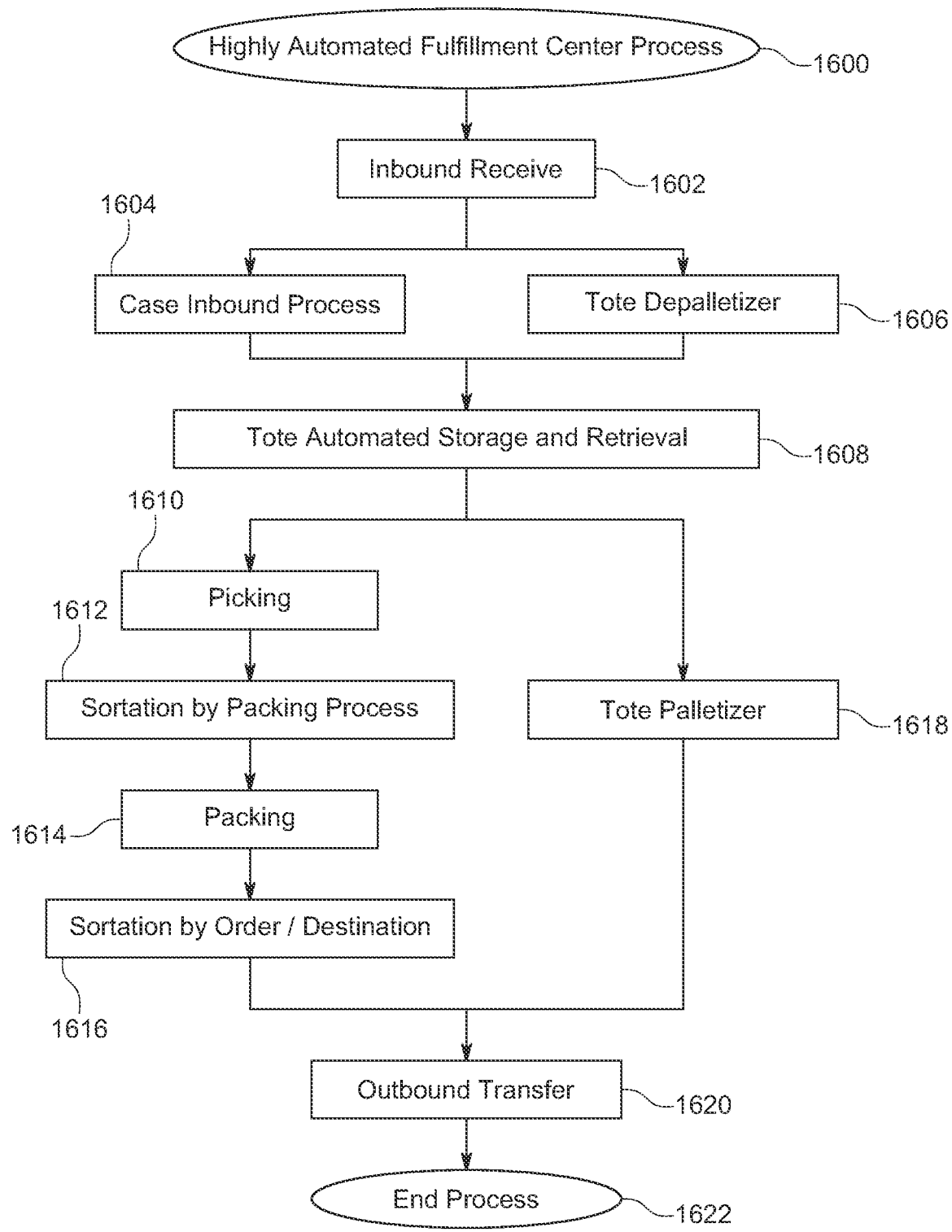
FIG. 16 is a flow diagram illustrating an example highly automated fulfillment center process, in accordance with implementations of the present disclosure.

FIG. 16 is a flow diagram illustrating an example highly automated fulfillment center process 1600, in accordance with implementations of the present disclosure.

The process 1600 may begin at inbound receive, as at 1602. For example, at inbound receive, one or more autonomous mobile robots (AMRs), robotic drive units, or other types of vehicles may receive or retrieve boxes, cases, totes, or pallets from transport containers. The AMRs, robots, or vehicles may couple to, engage, grasp, and/or lift the boxes, cases, totes, or pallets, and then move the boxes, cases, totes, or pallets from the transport containers. In addition, various automated machines or equipment may remove tape, shrinkwrap, straps, covers, lids, or other components from the boxes, cases, totes, or pallets. Further, a control system may instruct the various systems, machines, or equipment associated with inbound receive.

The process 1600 may continue to case inbound process, as at 1604, or to a tote depalletizer, as at 1606. For example, for boxes or cases that have been received, the case inbound process may comprise various stations or processes, including a case depalletizer, parcel identification, parcel labeling, automated or manual box cutting, dunnage removal, automated item transfer to totes, manual item preparation and item transfer to totes, a captive or certified tote item transfer and counting process, item singulation, and/or item sortation. Further details of each of the various stations or processes included in the case inbound process are described at least with respect to FIG. 17. Alternatively, for totes that have been received, the totes may be transferred to the tote depalletizer to depalletize and destack totes for downstream transfer. Further, a control system may instruct the various systems, machines, or equipment associated with the case inbound process and/or the tote depalletizer.

The process 1600 may proceed to a tote automated storage and retrieval system, as at 1608. For example, totes may be transferred from the case inbound process and/or from the tote depalletizer to the tote automated storage and retrieval system. The totes may be referred to as storage totes herein, and individual totes may receive or contain one or more items of a single type, or multiple items of different types. At the tote automated storage and retrieval system, the storage totes may be placed, inserted, sorted, and/or stored into one or more shelves or structures, and one or more AMRs or robots may couple to, engage, lift, and/or move the shelves or structures between various locations within the tote automated storage and retrieval system. In addition, one or more AMRs or robots may couple to, engage, lift, and/or move the shelves or structures between various locations in order to retrieve or remove one or more storage totes from within the tote automated storage and retrieval system. Further, a control system may instruct the various systems, machines, or equipment associated with the tote automated storage and retrieval system.

The process 1600 may then continue to picking, sortation by packing process, packing, and sortation by order/destination, as at 1610, 1612, 1614, 1616, or to a tote palletizer, as at 1618. For example, for totes that have been retrieved and that are intended for outbound transfer directly without any processing of items within the totes, the totes may be transferred to a tote palletizer to stack and palletize totes for outbound transfer, as at 1618. Alternatively, for totes that have been retrieved and from which one or more items are to be picked for processing, the totes may be transferred to automated picking or manual picking, as at 1610. The individual picked items may then be sorted, buffered, and/or combined based at least in part on their associated packing types, such as single item packages, multiple item packages, paper packaging, plastic packaging, corrugate packaging, other packing types, or combinations thereof, as at 1612. Further details of the sortation by packing process are described at least with respect to FIG. 19.

Then, individual items or groups of items may be packed into packages according to their associated packing types, as at 1614. Moreover, the packages may be sorted, combined, and/or consolidated into gaylords, pallets, or other groups of packages for outbound transfer based on their associated orders and/or destinations, as at 1616. Further, a control system may instruct the various systems, machines, or equipment associated with picking, sortation by packing process, packing, sortation by order/destination, and/or the tote palletizer.

The process 1600 may then proceed to outbound transfer, as at 1620. For example, at outbound transfer, one or more autonomous mobile robots (AMRs), robotic drive units, or other types of vehicles may receive or retrieve boxes, cases, totes, gaylords, or pallets from packing machines, sortation systems, case palletizers, and/or tote palletizers. The AMRs, robots, or vehicles may couple to, engage, grasp, and/or lift the boxes, cases, totes, gaylords, or pallets, and then move the boxes, cases, totes, gaylords, or pallets to transport containers. In addition, various automated machines or equipment may add tape, shrinkwrap, straps, covers, lids, or other components to the boxes, cases, totes, gaylords, or pallets. Further, a control system may instruct the various systems, machines, or equipment associated with outbound transfer.

The process 1600 may then end, as at 1622.

Figure 17:
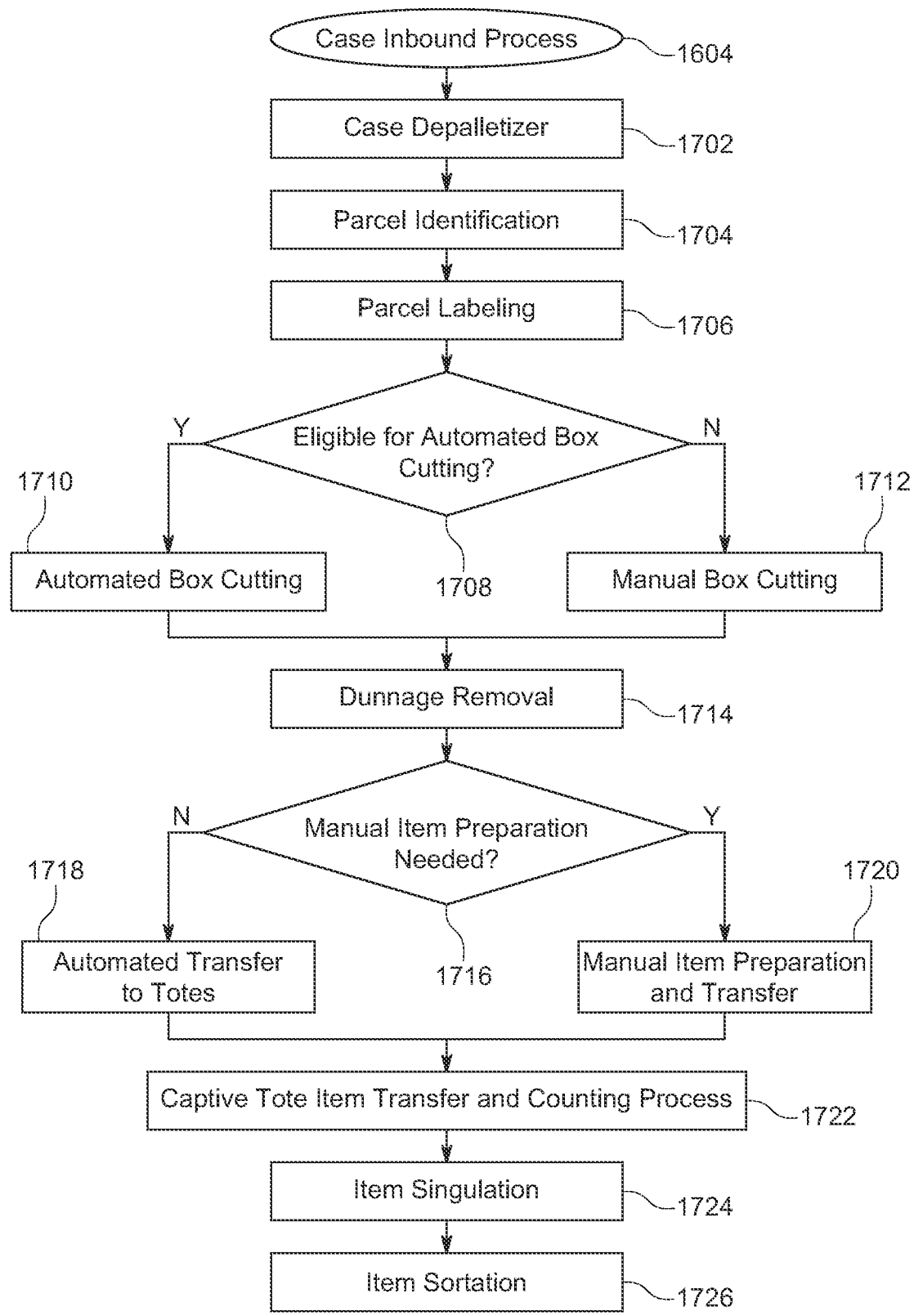
FIG. 17 is a flow diagram illustrating an example case inbound process, in accordance with implementations of the present disclosure.

FIG. 17 is a flow diagram illustrating an example case inbound process 1604, in accordance with implementations of the present disclosure.

The case inbound process 1604, as briefly described at least with respect to FIG. 16, may comprise various stations or processes, including a case depalletizer, parcel identification, parcel labeling, automated or manual box cutting, dunnage removal, automated item transfer to totes, manual item preparation and item transfer to totes, a captive or certified tote item transfer and counting process, item singulation, and/or item sortation.

The case inbound process 1604 may begin at a case depalletizer, as at 1702. For example, the case depalletizer may depalletize, destack, separate, and/or singulate pallets of boxes or cases for downstream transfer. Further, a control system may instruct the various systems, machines, or equipment associated with the case depalletizer.

The case inbound process 1604 may continue to parcel identification, as at 1704. For example, one or more imaging or scanning devices or other types of sensors may detect and identify separated or singulated boxes or cases. In addition, various characteristics or attributes associated with individual boxes or cases may be determined, such as source, contents, items, types, weight, dimensions, handling rules, or other characteristics. Further, a control system may instruct the various systems, machines, or equipment associated with parcel identification.

The case inbound process 1604 may proceed to parcel labeling, as at 1706. For example, based on the detected or determined characteristics, individual boxes or cases may be labeled with various information, such as information associated with a source, expected contents or items, handling rules, downstream processing or routing, and/or other information related to processing of the boxes or cases through the example fulfillment center. Further, a control system may instruct the various systems, machines, or equipment associated with parcel labeling.

The case inbound process 1604 may then continue to determine whether individual boxes or cases are eligible for automated box cutting, as at 1708. For example, a vision system may detect and determine whether individual boxes or cases are eligible, e.g., based on condition, size, shape, dimensions, seams, flaps, tapelines, or other characteristics or attributes of boxes or cases for automated box cutting. Further, a control system may instruct the various systems, machines, or equipment associated with detecting and determining eligibility for automated or manual box cutting.

If it is determined that individual boxes or cases are eligible for automated box cutting, the boxes or cases may be routed to automated box cutting, as at 1710. For example, an automated box cutting machine may receive and automatically cut open the boxes or cases. If, however, it is determined that individual boxes or cases are not eligible for automated box cutting, the boxes or cases may be routed to manual box cutting, as at 1712. For example, human agents or associates may receive and manually cut open the boxes or cases. Further, a control system may instruct the various systems, machines, or equipment associated with automated or manual box cutting.

The case inbound process 1604 may then proceed to dunnage removal, as at 1714. For example, human agents or associates may open the cut boxes or cases, and manually remove dunnage or other packing materials. Further, a control system may instruct the various systems, machines, or equipment associated with dunnage removal.

The case inbound process 1604 may continue to determine whether manual item preparation is needed, as at 1716. For example, human agents or associates may determine whether items in boxes or cases require opening, separating, aggregating, repackaging, or other manual processing. Further, a control system may instruct the various systems, machines, or equipment associated with determining need for manual item preparation.

If it is determined that manual item preparation is not needed, the boxes or cases may be routed to automated transfer to totes, as at 1718. For example, one or more robotic arms may grasp and lift the boxes or cases, and decant or empty the items from the boxes or cases. The items may be placed onto cleated conveyors, and various items or groups of items may be transferred to transfer totes from the cleated conveyors. Further, a control system may instruct the various systems, machines, or equipment associated with automated transfer to totes.

If, however, it is determined that manual item preparation is needed, the boxes or cases may be routed to manual item preparation and transfer, as at 1720. For example, human agents or associates may perform various manual processing tasks upon the items within the boxes or cases. In addition, the items may be placed onto cleated conveyors, and various items or groups of items may be transferred to transfer totes from the cleated conveyors. Further, a control system may instruct the various systems, machines, or equipment associated with manual item preparation and transfer to totes.

The case inbound process 1604 may proceed to a captive or certified tote item transfer and counting process, as at 1722. For example, the captive or certified tote item transfer and counting process may comprise various stations or processes, in order to determine an accurate count of items of all types that are received by the example fulfillment center. Further details of the captive or certified tote item transfer and counting process are described at least with respect to FIG. 18. Further, a control system may instruct the various systems, machines, or equipment associated with the captive or certified tote item transfer and counting process.

The case inbound process 1604 may then continue to item singulation, as at 1724. For example, automated item singulation machines may decant items from the captive or certified totes, and separate and singulate the items for downstream transfer to automated item sortation machines. Further, a control system may instruct the various systems, machines, or equipment associated with item singulation.

The case inbound process 1604 may then continue to item sortation, as at 1726. For example, automated item sortation machines may sort, combine, or consolidate items to storage totes for downstream transfer to the tote automated storage and retrieval system. Some storage totes may receive items of a single type, and/or other storage totes may receive items of multiple types. Further, a control system may instruct the various systems, machines, or equipment associated with item sortation.

Figure 18:
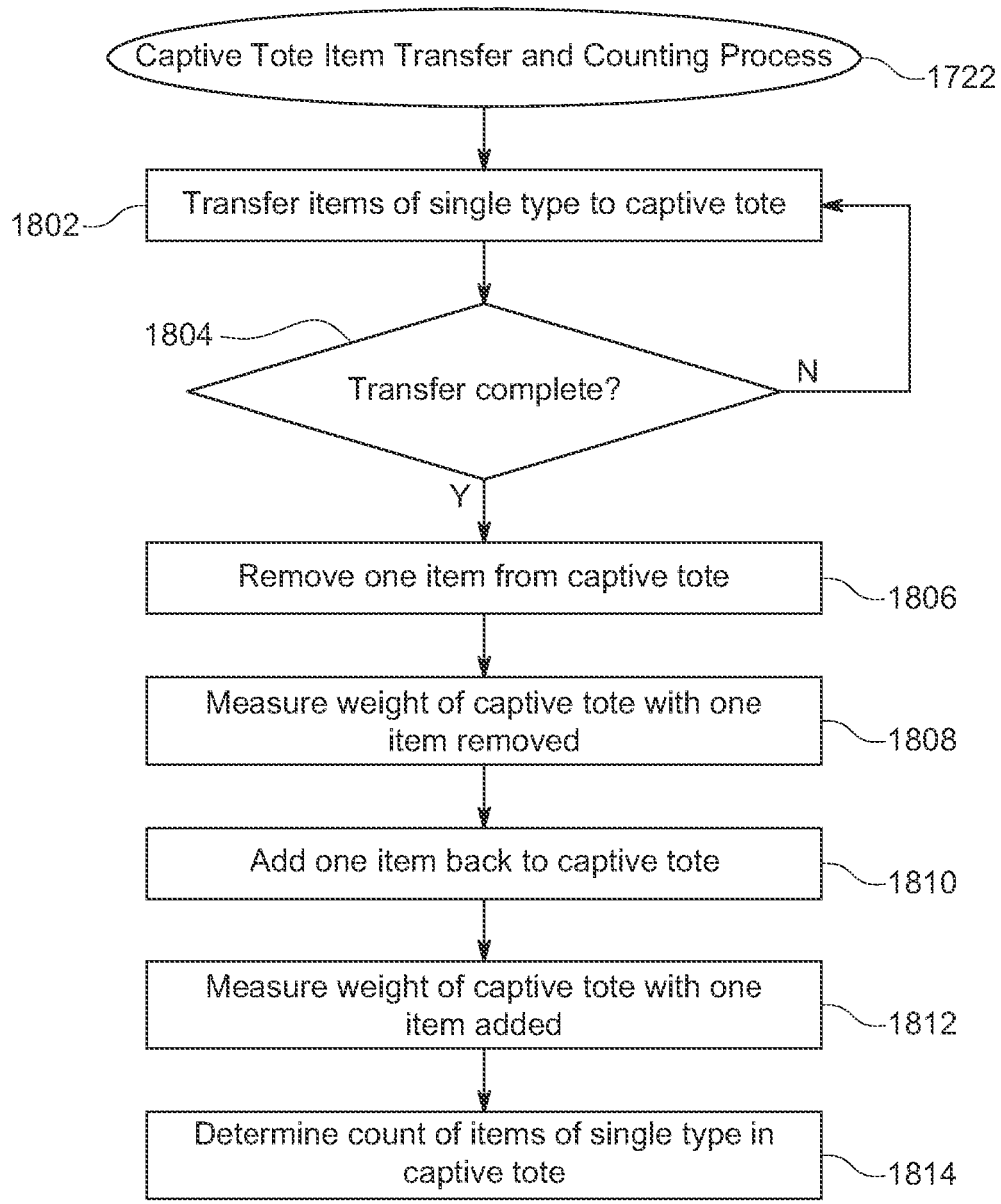
FIG. 18 is a flow diagram illustrating an example captive tote item transfer and counting process, in accordance with implementations of the present disclosure.

FIG. 18 is a flow diagram illustrating an example captive tote item transfer and counting process 1722, in accordance with implementations of the present disclosure.

The captive or certified tote item transfer and counting process 1722 may begin with transferring items of a single type to a captive or certified tote, as at 1802. For example, one or more human agents or associates may transfer items of a single type from transfer totes to a captive or certified tote. A captive or certified tote may be a tote having known, controlled, or verified weights, dimensions, or other characteristics or attributes, such that items received by the certified tote may be accurately weighed and counted at least partially automatically. Further, a control system may instruct the various systems, machines, or equipment associated with transferring items to captive or certified totes.

The captive or certified tote item transfer and counting process 1722 may continue to determine whether transfer of items is complete, as at 1804. For example, human agents or associates may indicate or confirm when transfer of items of a single type to a captive or certified tote is complete. Further, a control system may instruct the various systems, machines, or equipment associated with determining completion of transfer. If the transfer of items is not complete, the process may return to step 1802, until such transfer is indicated or confirmed as complete.

If the transfer of items of a single type is complete, the captive or certified tote item transfer and counting process 1722 may proceed to remove one item from the captive or certified tote, as at 1806. For example, human agents or associates may remove one item from a captive or certified tote having items of a single type. Further, a control system may instruct the various systems, machines, or equipment associated with item removal.

The captive or certified tote item transfer and counting process 1722 may then continue to measure the weight of the captive or certified tote with the one item removed, as at 1808. For example, an automated measuring device, such as a scale or other weight measurement device, may detect a weight of the captive or certified tote from which one item has been removed. Further, a control system may instruct the various systems, machines, or equipment associated with weight measurement.

The captive or certified tote item transfer and counting process 1722 may then proceed to add the one item back to the captive or certified tote, as at 1810. For example, human agents or associates may add the one item back to the captive or certified tote having items of a single type. Further, a control system may instruct the various systems, machines, or equipment associated with item addition.

The captive or certified tote item transfer and counting process 1722 may continue to measure the weight of the captive or certified tote with the one item added, as at 1812. For example, an automated measuring device, such as a scale or other weight measurement device, may detect a weight of the captive or certified tote to which the one item has been added. Further, a control system may instruct the various systems, machines, or equipment associated with weight measurement.

The captive or certified tote item transfer and counting process 1722 may proceed to determine a count of items of the single type in the captive or certified tote, as at 1814. For example, based on a known weight of the captive or certified tote and the measured weights of the captive or certified tote with and without the one item, a count of items of the single type within the captive or certified tote may be determined.

In one example, the known weight of the certified tote may be subtracted from the measured weight of the certified tote with the one item added back, in order to determine a total weight of all items of the single type. In addition, a difference between the measured weight of the certified tote with the one item added back and the measured weight of the certified tote with the one item removed may be calculated, in order to determine a weight of a single item. Then, the total weight of all items of the single type may be divided by the weight of the single item to determine an accurate count of the number of items of the single type within the certified tote. Further, a control system may instruct the various systems, machines, or equipment associated with item count determination.

Figure 19:
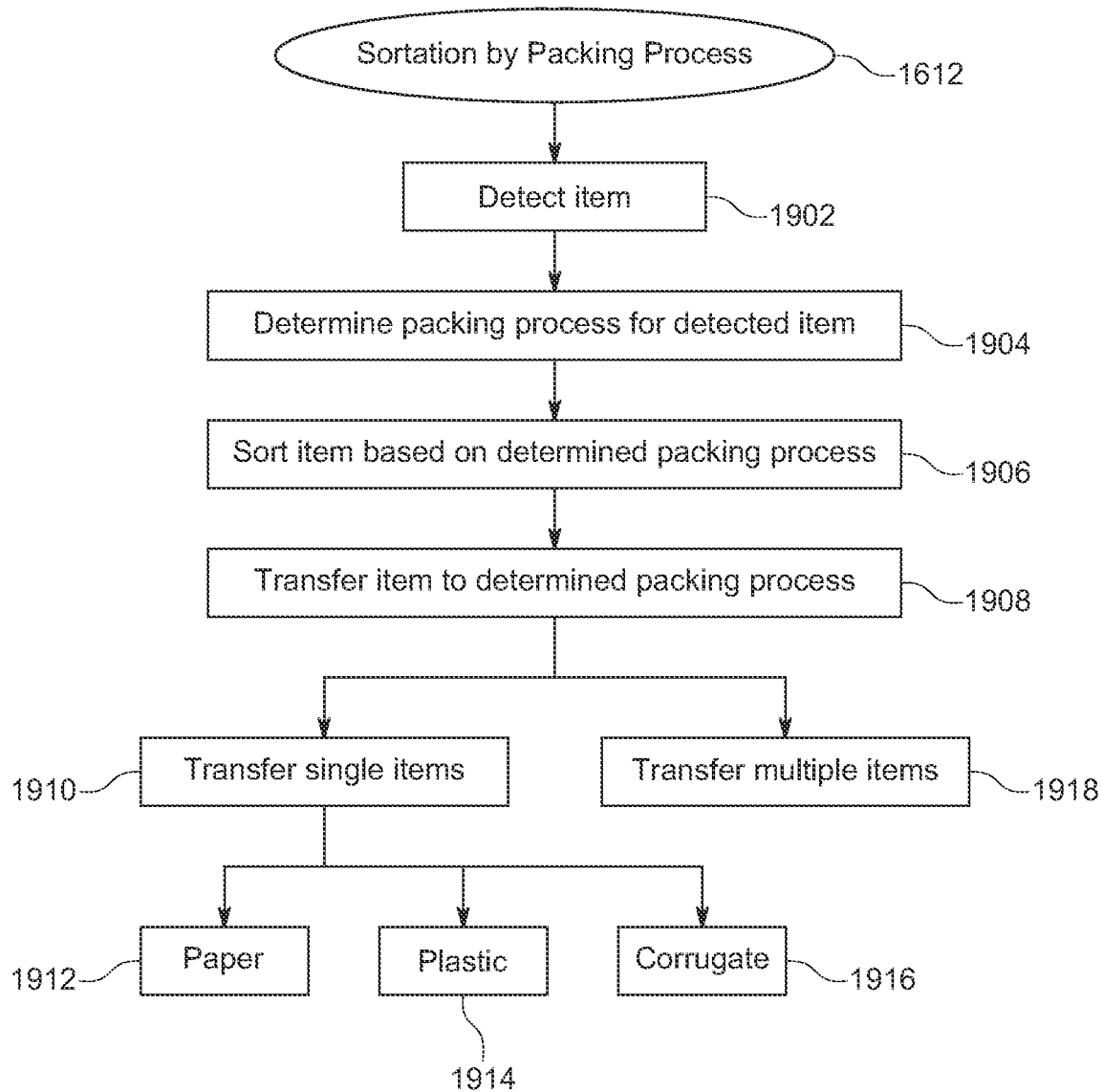
FIG. 19 is a flow diagram illustrating an example sortation by packing process, in accordance with implementations of the present disclosure.

FIG. 19 is a flow diagram illustrating an example sortation by packing process 1612, in accordance with implementations of the present disclosure.

The sortation by packing process 1612 may begin with detecting an item, as at 1902. For example, the item may have been picked from storage totes and transferred downstream for packing. In addition, a vision system may detect and identify the item and various associated characteristics or attributes. Further, a control system may instruct the various systems, machines, or equipment associated with detecting and identifying an item.

The sortation by packing process 1612 may continue to determine a packing process for the detected item, as at 1904. For example, based on the characteristics of the identified item, a packing type and/or packing process for the item may be determined, e.g., with reference to data stored in memory. Various packing types and/or processes may include single item packages, multiple item packages, paper packaging, plastic packaging, corrugate packaging, other packing types, or combinations thereof. Further, a control system may instruct the various systems, machines, or equipment associated with determining a packing type or process for an item.

The sortation by packing process 1612 may proceed to sort the item based on the determined packing process, as at 1906. For example, based on the determining packing type and/or packing process for the item, the item may be routed to automated item sortation machines to sort, store, buffer, combine, or consolidate the item in preparation for packing. Various automated item sortation machines may be associated with particular packing types and/or processes. Further, a control system may instruct the various systems, machines, or equipment associated with sorting an item based on a packing type or process.

The sortation by packing process 1612 may then continue to transfer the item to the determined packing process, as at 1908. For example, the item may be transferred from the automated item sortation machines to the associated automated packing machine. As described herein, the item may be routed via trays, totes, containers, conveyors, cleated conveyors, or other material handling equipment to the respective automated packing machine. In addition, items to be packed in single item packages may be routed to respective automated, single item packing machines, as at 1910, and items to be packed in multiple item packages may be routed to respective automated, multiple item packing machines, as at 1918. Further, a control system may instruct the various systems, machines, or equipment associated with transferring an item to a determined packing process.

Moreover, for single item packages, the items may be packed in paper, plastic, or corrugate packing materials, as at 1912, 1914, 1916. For example, flat, thin, lightweight, or other types of items may be packed in paper or plastic packaging, whether padded or unpadded paper or plastic. In addition, large, bulky, heavy, or other types of items may be packed in corrugate packaging. Various other types of packing materials may be used for various types of items. Generally, for multiple item packages, the items may be packed in corrugate packaging by automated packing machines. However, various other types of packing materials may also be used for multiple item packages. Further, a control system may instruct the various systems, machines, or equipment associated with automated packing of packages.

Figure 20:
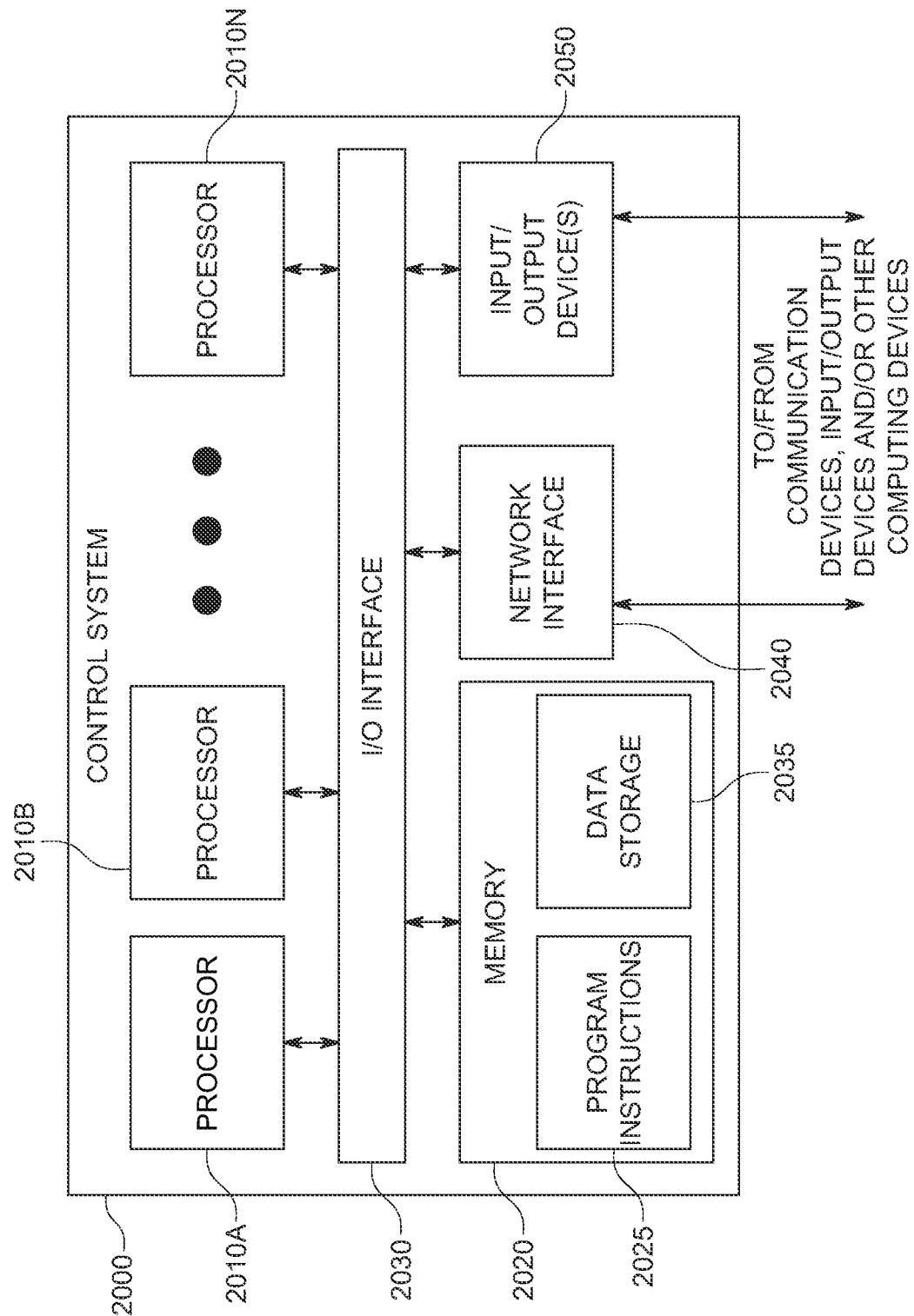
FIG. 20 is a block diagram illustrating various components of an example control system, in accordance with implementations of the present disclosure.

FIG. 20 is a block diagram illustrating various components of an example control system 2000, in accordance with implementations of the present disclosure.

Various operations of a control system or controller, such as those described herein, may be executed on one or more computer systems, and/or interact with various other computers, systems, or devices in a material handling facility, according to various implementations. For example, the control system or controller discussed above may function and operate on one or more computer systems. One such control system is illustrated by the block diagram in FIG. 20. In the illustrated implementation, a control system 2000 includes one or more processors 2010A, 2010B through 2010N, coupled to a non-transitory computer-readable storage medium 2020 via an input/output (I/O) interface 2030. The control system 2000 further includes a network interface 2040 coupled to the I/O interface 2030, and one or more input/output devices 2050. In some implementations, it is contemplated that a described implementation may be implemented using a single instance of the control system 2000 while, in other implementations, multiple such systems or multiple nodes making up the control system 2000 may be configured to host different portions or instances of the described implementations. For example, in one implementation, some data sources or services (e.g., related to portions of example fulfillment center systems, operations, or processes, etc.) may be implemented via one or more nodes of the control system 2000 that are distinct from those nodes implementing other data sources or services (e.g., related to other portions of example fulfillment center systems, operations, or processes, etc.).

In various implementations, the control system 2000 may be a uniprocessor system including one processor 2010A, or a multiprocessor system including several processors 2010A-2010N (e.g., two, four, eight, or another suitable number). The processors 2010A-2010N may be any suitable processor capable of executing instructions. For example, in various implementations, the processors 2010A-2010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 2010A-2010N may commonly, but not necessarily, implement the same ISA.

The non-transitory computer-readable storage medium 2020 may be configured to store executable instructions and/or data accessible by the one or more processors 2010A-2010N. In various implementations, the non-transitory computer-readable storage medium 2020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 2020 as program instructions 2025 and data storage 2035, respectively. In other implementations, program instructions and/or data may be received, sent or stored upon different types of computer-accessible media, such as non-transitory media, or on similar media separate from the non-transitory computer-readable storage medium 2020 or the control system 2000. Generally speaking, a non-transitory, computer-readable storage medium may include storage media or memory media such as magnetic or optical media, e.g., disk or CD/DVD-ROM, coupled to the control system 2000 via the I/O interface 2030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 2040.

In one implementation, the I/O interface 2030 may be configured to coordinate I/O traffic between the processors 2010A-2010N, the non-transitory computer-readable storage medium 2020, and any peripheral devices, including the network interface 2040 or other peripheral interfaces, such as input/output devices 2050. In some implementations, the I/O interface 2030 may perform any necessary protocol, timing or other data transformations to convert data signals from one component (e.g., non-transitory computer-readable storage medium 2020) into a format suitable for use by another component (e.g., processors 2010A-2010N). In some implementations, the I/O interface 2030 may include support for devices attached through various types of peripheral buses, such as a variant of the Peripheral Component Interconnect (PCI) bus standard or the Universal Serial Bus (USB) standard, for example. In some implementations, the function of the I/O interface 2030 may be split into two or more separate components, such as a north bridge and a south bridge, for example. Also, in some implementations, some or all of the functionality of the I/O interface 2030, such as an interface to the non-transitory computer-readable storage medium 2020, may be incorporated directly into the processors 2010A-2010N.

The network interface 2040 may be configured to allow data to be exchanged between the control system 2000 and other devices attached to a network, such as other control systems, material handling system controllers, warehouse management systems, other computer systems, automated systems, devices, machinery, or equipment, robotic arms, machines, or systems, gantry systems, machinery, or equipment, autonomous mobile robots, robotic drive units, vehicles, various stations or processes, various types of sensors, various types of vision systems, imaging devices, or imaging sensors, conveyance systems, machinery, or equipment, sortation systems, machinery, or equipment, upstream stations or processes, downstream stations or processes, other material handling systems or equipment, or between nodes of the control system 2000. In various implementations, the network interface 2040 may support communication via wired or wireless general data networks, such as any suitable type of Ethernet network.

Input/output devices 2050 may, in some implementations, include one or more visual input/output devices, displays, projection devices, keyboards, keypads, touchpads, audio input/output devices, microphones, speakers, scanning devices, imaging devices, sensors, photo eyes, proximity sensors, RFID readers, voice or optical recognition devices, or any other devices suitable for entering or retrieving data by one or more control systems 2000. Multiple input/output devices 2050 may be present in the control system 2000 or may be distributed on various nodes of the control system 2000. In some implementations, similar input/output devices may be separate from the control system 2000 and may interact with one or more nodes of the control system 2000 through a wired or wireless connection, such as over the network interface 2040.

As shown in FIG. 20, the memory 2020 may include program instructions 2025 that may be configured to implement one or more of the described implementations and/or provide data storage 2035, which may comprise various tables, data stores and/or other data structures accessible by the program instructions 2025. The program instructions 2025 may include various executable instructions, programs, or applications to facilitate example fulfillment center operations and processes described herein, such as automated systems, machinery, or equipment controllers, drivers, or applications, robotic arm or gantry system controllers, drivers, or applications, autonomous mobile robot, robotic drive unit, or vehicle controllers, drivers, or applications, various station or process controllers, drivers, or applications, sensor controllers, drivers, or applications, sensor data processing applications, vision system or imaging device controllers, drivers, or applications, imaging data processing applications, conveyance, sortation, and material handling equipment controllers, drivers, or applications, upstream station controllers, drivers, or applications, downstream station controllers, drivers, or applications, etc. The data storage 2035 may include various data stores for maintaining data related to systems, operations, or processes described herein, such as automated systems, machinery, or equipment, robotic arms or gantry systems, machines, or apparatus, autonomous mobile robots, robotic drive units, vehicles, various stations or processes, automated storage and retrieval systems, sensors, sensor data, vision systems or imaging devices, imaging data, boxes, cases, totes, pallets, gaylords, associated weights, items, item weights, item counts, objects, packing types or processes, packages, associated destinations, containers, conveyance, sortation, and material handling equipment or apparatus, upstream systems, stations, or processes, downstream systems, stations, or processes, etc.

Those skilled in the art will appreciate that the control system 2000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 2000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 16-19, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to operate a fulfillment center, comprising:
   receiving, via an inbound transport system, a pallet of cases from an origin;
   transferring, via an autonomous mobile robot, the pallet of cases to an automated case depalletizer;
   depalletizing, via the automated case depalletizer, the cases from the pallet to a conveyor;
   identifying, via an automated scanning device, the cases on the conveyor;
   labeling, via an automated labeling device, the cases on the conveyor;
   cutting, via an automated cutting device, the cases on the conveyor;
   decanting, via a robotic arm, items from the cases onto a cleated conveyor;
   transferring, via the cleated conveyor, the items to one or more transfer totes;
   transferring, via an agent, items of a single type from the one or more transfer totes to a certified tote;
   counting, via an automated measurement device, a number of the items of the single type in the certified tote;
   singulating, via an automated singulation device, the items of the single type from the certified tote;
   sorting, via an automated sortation device, the items of the single type to one or more storage totes;
   storing, via a tote automated storage and retrieval system, the one or more storage totes;
   retrieving, via the tote automated storage and retrieval system, a storage tote;
   picking, via a robotic arm, an item from the storage tote;
   sorting, to one of a plurality of automated buffer devices, the item based on a packing type associated with the item;
   transferring, to one of a plurality of automated packing machines, the item based on the packing type associated with the item;
   packing, via the one of the plurality of automated packing machines, the item in a package that corresponds to the packing type;
   sorting, to one of a plurality of automated outbound processes, the package based on a destination associated with the package; and
   transferring, via an outbound transport system, the package to the destination.

2. The method of claim 1, wherein the plurality of automated packing machines comprises at least one of an automated paper packing machine, an automated plastic packing machine, or an automated corrugate packing machine.

3. The method of claim 1, wherein the plurality of automated outbound processes comprises at least one of an automated cross belt sorter, an automated case palletizer, or an automated fluid loading device.

4. The method of claim 1, further comprising:
   receiving, via the inbound transport system, a pallet of inbound totes from the origin;
   transferring, via an autonomous mobile robot, the pallet of inbound totes to an automated tote depalletizer;
   depalletizing, via the automated tote depalletizer, the inbound totes from the pallet to one or more robotic drive units;
   transferring, via the one or more robotic drive units, the inbound totes to the tote automated storage and retrieval system;
   storing, via the tote automated storage and retrieval system, the inbound totes;
   retrieving, via the tote automated storage and retrieval system, an outbound tote;
   transferring, via a robotic drive unit, the outbound tote to an automated tote palletizer;
   palletizing, via the automated tote palletizer, the outbound tote to a pallet of outbound totes based on a destination associated with the outbound tote; and
   transferring, via the outbound transport system, the pallet of outbound totes to the destination.

5. An automated item processing method, comprising:
   identifying, via an automated scanning device, an item to be packed;
   determining, via a controller, a packing type associated with the item;
   transferring, to one of a plurality of automated sortation devices, the item based on the packing type;
   transferring, from the one of the plurality of automated sortation devices to one of a plurality of automated packing machines, the item based on the packing type;
   packing, via the one of the plurality of automated packing machines, the item in a package that corresponds to the packing type;
   transferring, to one of a plurality of automated outbound processes, the package based on a destination associated with the package; and
   transferring, via an outbound transport system, the package to the destination.

6. The method of claim 5, wherein the packing type comprises at least one of paper, plastic, corrugate, single item, or multiple item.

7. The method of claim 5, wherein the plurality of automated packing machines comprises at least one of a paper packing machine, a plastic packing machine, or a corrugate packing machine.

8. The method of claim 5, wherein the package comprises at least one of a single item package or a multiple item package.

9. The method of claim 5, wherein the plurality of automated outbound processes comprises at least one of a cross belt sorter to receive single item packages, a case palletizer to receive multiple item packages, or a fluid loading device to receive multiple item packages.

10. The method of claim 5, further comprising:
retrieving, via a tote automated storage and retrieval system, a storage tote; and
picking, via a robotic arm, the item to be packed from the storage tote.

11. The method of claim 10, further comprising:
receiving, via a plurality of automated inbound processes, the item to be packed; and
storing, via the tote automated storage and retrieval system, the storage tote with the item to be packed.

12. The method of claim 11, wherein receiving, via the plurality of automated inbound processes, the item to be packed, further comprises at least one of:
receiving, via an inbound transport system, a pallet of cases including the item to be packed;
depalletizing, via an automated case depalletizer, the cases from the pallet to a conveyor;
identifying, via an automated scanning device, the cases on the conveyor;
labeling, via an automated labeling device, the cases on the conveyor;
cutting, via an automated cutting device, the cases on the conveyor;
decanting, via a robotic arm, items from the cases onto a cleated conveyor;
transferring, via the cleated conveyor, the item to be packed to a transfer tote;
transferring, via an agent, items of a single type including the item to be packed from the transfer tote to a certified tote;
singulating, via an automated singulation device, the item to be packed from the certified tote; and
sorting, via an automated sortation device, the item to be packed to the storage tote.

13. The method of claim 12, further comprising:
after transferring, via the agent, items of the single type including the item to be packed from the transfer tote to the certified tote:
determining, via an automated measurement device, a number of the items of the single type including the item to be packed in the certified tote.

14. The method of claim 13, wherein determining the number of the items of the single type in the certified tote further comprises:
removing, via the agent, the item to be packed from the certified tote;
measuring, via the automated measurement device, a first weight of the certified tote;
replacing, via the agent, the item to be packed to the certified tote;
measuring, via the automated measurement device, a second weight of the certified tote with the item to be packed; and
determining, via the controller, the number of the items of the single type including the item to be packed in the certified tote based on the first weight and the second weight.

* * * * *